United States Patent
Poon et al.

[11] Patent Number: 5,838,912
[45] Date of Patent: Nov. 17, 1998

[54] DISTRIBUTION OF DIGITALLY ENCODED PRESENTATIONS

[75] Inventors: Peter Poon, Somers, N.Y.; John Kalung Leung, Riverside, Conn.; Fred Tze-Keung Tong, Yorktown Heights, N.Y.

[73] Assignee: International Business Machines Corporation, Armonk, N.Y.

[21] Appl. No.: 701,854

[22] Filed: Sep. 4, 1996

[51] Int. Cl.$^6$ .................................................... G06F 17/00
[52] U.S. Cl. ...................................................... 395/200.34
[58] Field of Search ........................ 395/200.34, 200.79; 348/7, 13; 455/4.2; 370/395; 345/311

[56] References Cited

U.S. PATENT DOCUMENTS

| | | | |
|---|---|---|---|
| 5,371,532 | 12/1994 | Gelman et al. | 348/7 |
| 5,453,779 | 9/1995 | Dan et al. | 348/7 |
| 5,629,732 | 5/1997 | Moskowitz et al. | 348/13 |
| 5,666,487 | 9/1997 | Goodman et al. | 395/200.76 |
| 5,668,948 | 9/1997 | Belknap et al. | 345/311 |

FOREIGN PATENT DOCUMENTS

| | | | |
|---|---|---|---|
| 0491069 A1 | 6/1992 | European Pat. Off. | H04N 7/08 |
| 0633694 A1 | 1/1995 | European Pat. Off. | H04N 7/173 |
| 0673160 A1 | 9/1995 | European Pat. Off. | H04N 7/00 |
| 0749242 A1 | 12/1996 | European Pat. Off. | H04N 7/173 |
| 2296640 | 7/1996 | United Kingdom | H04N 7/173 |
| WO 95/26103 | 9/1995 | WIPO | H04N 5/76 |
| WO 95/32586 | 11/1995 | WIPO | H04N 7/173 |
| WO 96/13125 | 5/1996 | WIPO | H04N 7/173 |
| WO 97/16023 | 5/1997 | WIPO | H04N 7/173 |

*Primary Examiner*—Ellis B. Ramirez
*Attorney, Agent, or Firm*—Heslin & Rothenberg, P. C.

[57] ABSTRACT

Digitally encoded presentations are provided at the request and convenience of receivers associated with a data distribution system. The problem of reliably satisfying large numbers of randomly occurring receiver demands for digitally encoded presentations, particularly from a single storage copy of the presentation, and particularly for linear presentations, is addressed. The invention may be embodied in a system which includes a repository of digitally encoded presentations, cache memory for holding presentations which are being supplied to receivers, and a multicasting network for connecting the system to receivers. By grouping receivers into receiving groups for receiving multicasts of presentation segments, the system can satisfy the requests of any number of individual receivers, irrespective of other receivers receiving the presentation. For linear presentation, presentation segments may be defined to be of equal duration, and receiving groups may automatically be provided with sequential segments of the presentation. The system will optimally be capable of multicasting all segments of a linear presentation within a period equalling the predefined segment duration.

55 Claims, 23 Drawing Sheets

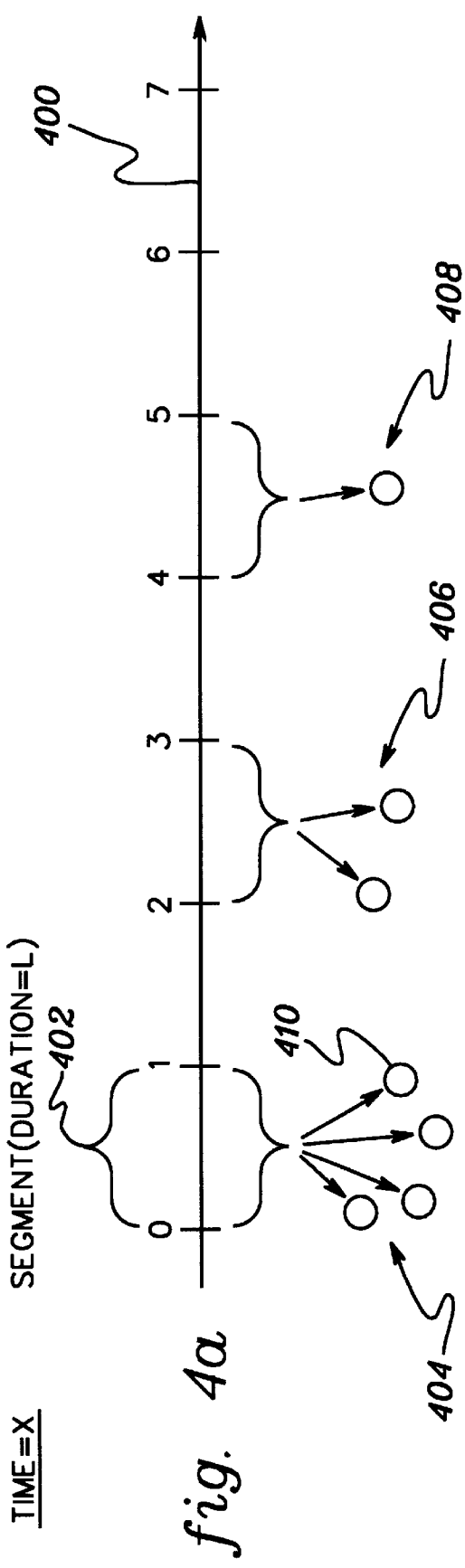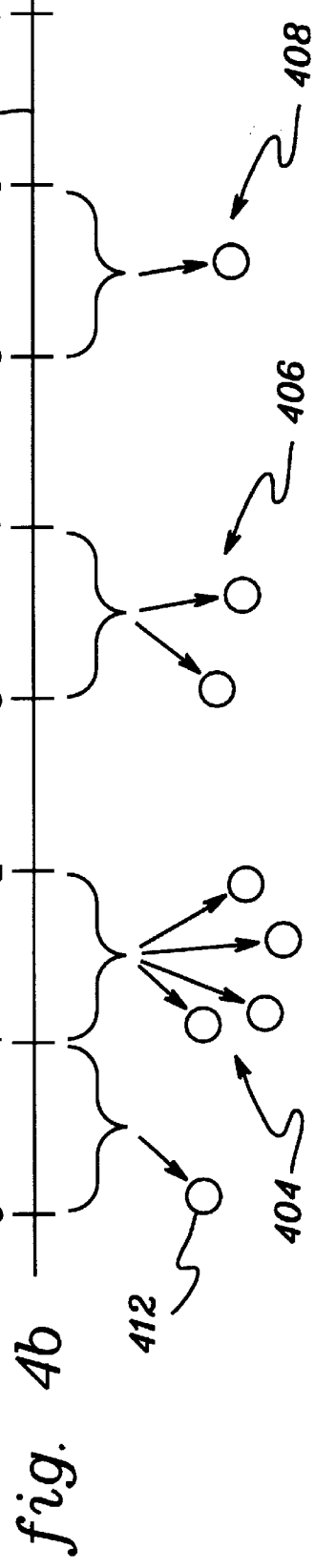

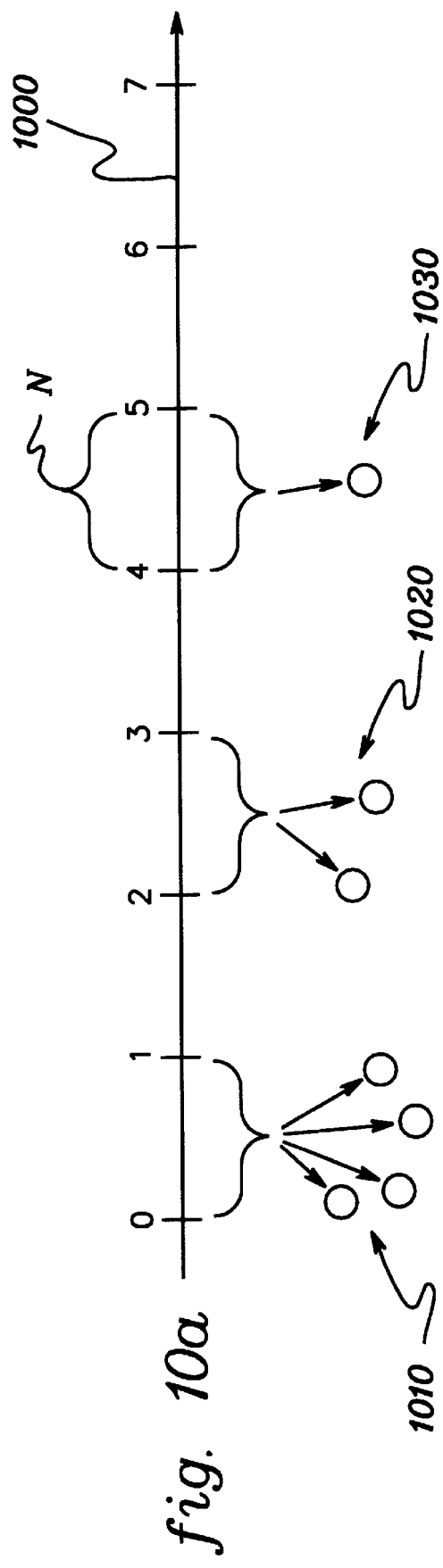
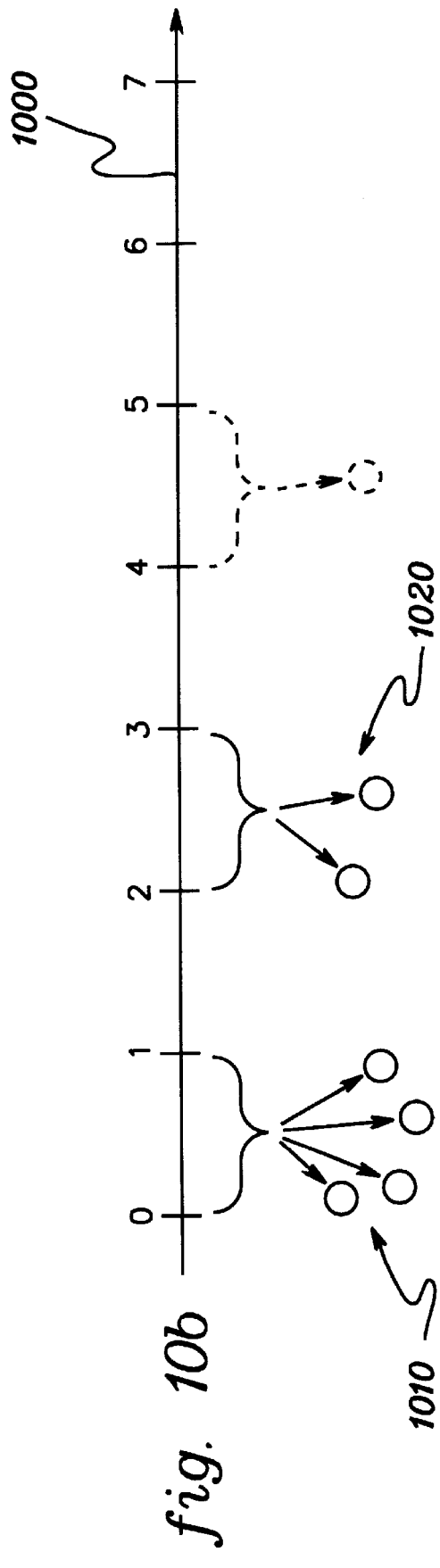

DISTRIBUTION OF DIGITALLY ENCODED PRESENTATIONS

FIELD OF THE INVENTION

The invention pertains to providing digitally encoded presentations at the request and convenience of receivers associated with a data distribution system. The invention addresses the problem of reliably satisfying large numbers of randomly occurring receiver demands for digitally encoded presentations, particularly from a single storage copy of the presentation, and particularly for presentations having a linear format.

BACKGROUND OF THE INVENTION

Digitally encoded presentations are presentations which are stored in a digital encoding format. Examples of digitally encoded presentations include computer generated multimedia presentations, movies stored on laser disc or magnetic tape, and digitized audio clips. Digitally encoded presentations may be provided through data servers.

In some instances a digitally encoded presentation may be linear in nature. Examples of linear presentations are movies, music videos, and sound recordings. Linear presentations may be digitally encoded in a number of various data encryption formats. For example, video may be encoded in the well-known MPEG or MPEG2 formats. Encryption formats such as MPEG and MPEG2 use an encryption method which specifies the frame rate of the video presentation and specific data pertaining to each sequential frame.

In other instances a digitally encoded presentation may be such that the viewer may select discrete parts of the presentation to be received without limitation as to the order in which they may be provided. An example of such a presentation is a collection of home pages which are made available through a server which is accessible through a network such as the "World Wide Web" on the Internet. The home pages included in such a presentation my provide content of a variety of types including linear presentations (for example, video or audio), graphic displays, still images, text, and other data objects.

Present technology enables the storage of digitally encoded presentations in a variety of formats and on a variety of media. Present technology further enables the transmission of digital data from one device to another using a variety of known transmission media and protocols. It is further known to link a number of digital data processing devices such as computers to form a network, thus allowing communication among the devices.

Present technology further enables the operation of "connectionless" data distribution systems. Connectionless data distribution systems are systems which do not maintain dedicated "open" connections between the nodes of the system, such as in a telephone system, but rather continually re-establish connections as necessary by routing addressed data packets to destination nodes using routing protocols. An example of a connectionless data distribution system is the World Wide Web on the Internet, which uses the hypertext transfer protocol (http) for routing data packets between nodes. Use of the http protocol allows the exchange of data between all nodes of the system without the need to maintain dedicated open connections between all nodes of the system. Known data transfer technology in connectionless environments includes the ability to multicast, i.e. to send data simultaneously from one device to many devices. Those of ordinary skill in the art will recognize that although multicasted communications are commonly conceived of as being simultaneous, they will generally not be exactly simultaneous, but rather will be substantially simultaneous within a range dictated by quantifiable system delays.

Present technology further enables digitally encoded presentations to be provided to requesters through data distribution systems in which requests are queued and processed by the system in the order of their receipt. Such systems are limited in their ability to serve large populations of requesters by the size of the request queue and the system processing speed.

SUMMARY OF THE INVENTION

While current knowledge enables the various uses of the components and technologies described above, present data distribution systems are presently limited in their ability to reliably satisfy large numbers of randomly occurring receiver demands for digitally encoded presentations. The present invention addresses this problem through the systems and methods of operation disclosed herein.

The invention in general terms treats digitally encoded presentations as being comprised of predefined discrete "segments" which may be individually provided by the system. A system in accordance with the invention will process requests for segments of a presentation by assigning each requester to a receiving group which is designated to receive the requested segment. Each requester requesting a segment within a "request window" period having a predefined duration will be assigned to a common receiving group which is designated to receive that segment. The segment is provided to members of the receiving group upon the closing of the request window. Where a receiving group contains multiple requesters, the segment data is provided through multicasting, such that all requesters in the receiving group are provided with the requested segment at the same time. Consequently, the system provides each segment of the presentation with a delay of not more than the duration of the request window associated with the particular segment. This manner of operation yields significant increases in system efficiency over the present method of nondiscriminatory queuing of all requests.

The invention may be employed in a variety of applications. For example, consider a multimedia presentation made available through a World Wide Web server on the Internet. Using present technology, requests issued for various home pages provided by the server (which may include, for example, text pages, video pages, graphics pages, audio pages, and data pages) will be queued in a system queue and processed serially by a system processor. Thus a person requesting a text page may be forced to wait while numerous earlier requesters of a much larger video page are provided one-at-a-time with the video page data.

In contrast, in accordance with the invention, the text page, the video page, and all other pages made available by the server will be treated as individual predefined segments of a "presentation". Each request received by the system will result in the assignment of the requester to a receiving group designated to receive the requested segment. Each group will gather new members during a predefined request window associated with the group. Each receiving group will receive its designated segment upon the closing of the request window. By grouping receivers in this manner, system delays in responding to requests for a particular segment will be consistently less than or equal to the predefined request window for that segment.

Where a digitally encoded presentation includes or consists of a linear segment such as a video segment, the invention may further include automatically incrementing the segment designation of a receiving group after a segment has been provided to the group so that the group is automatically provided with the sequential segments of the presentation. In such embodiments, a uniform request window is used for all segments of the presentation.

Embodiments of the invention which include automatic incrementing of receiving group segment designations may be optimized for providing "video on demand". As an example, a movie may be treated by the system as a linear presentation consisting of predefined 30 second segments and having a uniform 30 second request window for all segments. In accordance with the invention, every requester who requests the movie from the system within a given 30 second request window will be assigned to a single receiving group designated to receive data representing the first 30 second segment of the movie. The data for the first segment will be provided to the group upon the closing of the request window. Subsequently, after receiving the data representing the first 30 second segment, the receiving group will be redesignated to receive data representing the second 30 second segment of the movie. The process may be repeated until the entire movie has been provided to the receiving group. Systems in accordance with this embodiment of the invention will optimally have sufficient processing and throughput capabilities to supply the data for every segment of the presentation within a period of time which is equal to the presentation's request window. For example, if a two hour movie is divided into 30 second segments and uses a 30 second request window, the system would optimally be capable of providing all of the data for each of the 240-30 second segments within the 30 second request window. In this manner, the movie is effectively offered for viewing every 30 seconds. This method of transmission may be referred to as a "multistream simulcast" or "MSSC".

The comparative advantage which MSSC offers over current video on demand technology increases in proportion to system usage. To illustrate, consider a video on demand system in accordance with the invention which supplies a variety of movies to one hundred thousand subscribers. Further, assume that the typical movie is two hours (or 240-30 second segments) long. An old movie which is supplied by the system may be requested at a rate of once every ten minutes. Thus a requester of that movie will likely be the only requester within a 30 second period, and so he will be the only member of his receiving group. Nevertheless, another request for this movie received 30 minutes later will be fulfilled within 30 seconds from the same storage copy which is used to supply the earlier requester of the movie.

In comparison, however, a newly released movie may generate 25 requests within a 30 second request window. In accordance with the invention, the 25 viewers requesting the movie within that 30 second request window will be assigned to a single receiving group, and each viewer will simultaneously receive multicasts of the first and successive 30 second segments. It can thus be seen that by designating a 30 second duration as the basis for defining segments of the presentation, a multistream simulcast of all 240 segments can service 240 receiving groups which include all requesters of the two hour movie. These requesters will be serviced from a single storage copy and with a delay of less than 30 seconds, subject only to the restraints of the network in the number of receivers which can be serviced at one time. Longer or shorter segments may be chosen depending on the types of presentations provided and the demands which will be placed upon the system.

The various embodiments of the invention described above may be implemented in a variety of data serving systems. In accordance with an exemplary embodiment of the invention described in detail below, the system may include a repository of digitally encoded presentations, cache memory for storing data for presentation segments which have been requested by receivers, and multicasting connectivity means for connecting the system to receivers. In accordance with an exemplary embodiment of the invention optimized for video on demand applications, the system preferably includes dedicated cache processors for storing presentation segments and dedicated data export processors for distributing presentation segments to receivers and for managing receiving group membership and segment designations.

The invention may further include additional novel features which are preferred for practicing the invention in various embodiments, including embodiments optimized for providing video on demand. Such novel features may include various control processes for managing system operation, managing cache processor memory allocation, managing the creation and membership of receiving groups, and managing internal data object reading and updating operations. The invention may be embodied in computer readable program code means stored in a computer useable media for implementing the disclosed processes on suitable computer hardware. Such computer readable program code means may be provided in association with a hardware system embodying the invention or may be provided independently of a hardware system.

DESCRIPTION OF THE DRAWINGS

The general description provided above, as well as other novel features, devices, and methods of operation pertaining to the invention, will be more readily understood from the following detailed description and the accompanying drawings in which:

FIGS. 4a and 4b depict examples of receiving groups and their associated presentation segments at first and second consecutive intervals during the distribution of a linear presentation to those groups in accordance with the invention;

FIGS. 10a–10d depict the removal of a receiver issuing a pause command from its receiving group and its reassignment to a new group under various circumstances by a data exporter of a preferred embodiment of the invention;

DETAILED DESCRIPTION OF THE INVENTION

I. A general application of the invention for providing digitally encoded presentations.

The invention as described in general terms above may be employed in accordance with a variety of data serving applications. To provide an illustrative example of one such application, reference is first made to FIG. 1, which illustrates a system in accordance with current knowledge in the art for providing a multimedia presentation over a network in a connectionless environment such as the World Wide Web. The exemplary presentation of FIG. 1 consists of discrete parts which include a text page 102, a video page 104, a graphics page 106, an audio page 108, and a data page 110. It is noted that the illustrated multimedia presentation is only exemplary and that the presentation could consist of any number of each type of page and that pages need not be stored in the server itself. It is further noted that the pages of a given presentation may or may not be intended to be provided in a predetermined order of presentation.

Figure 1:
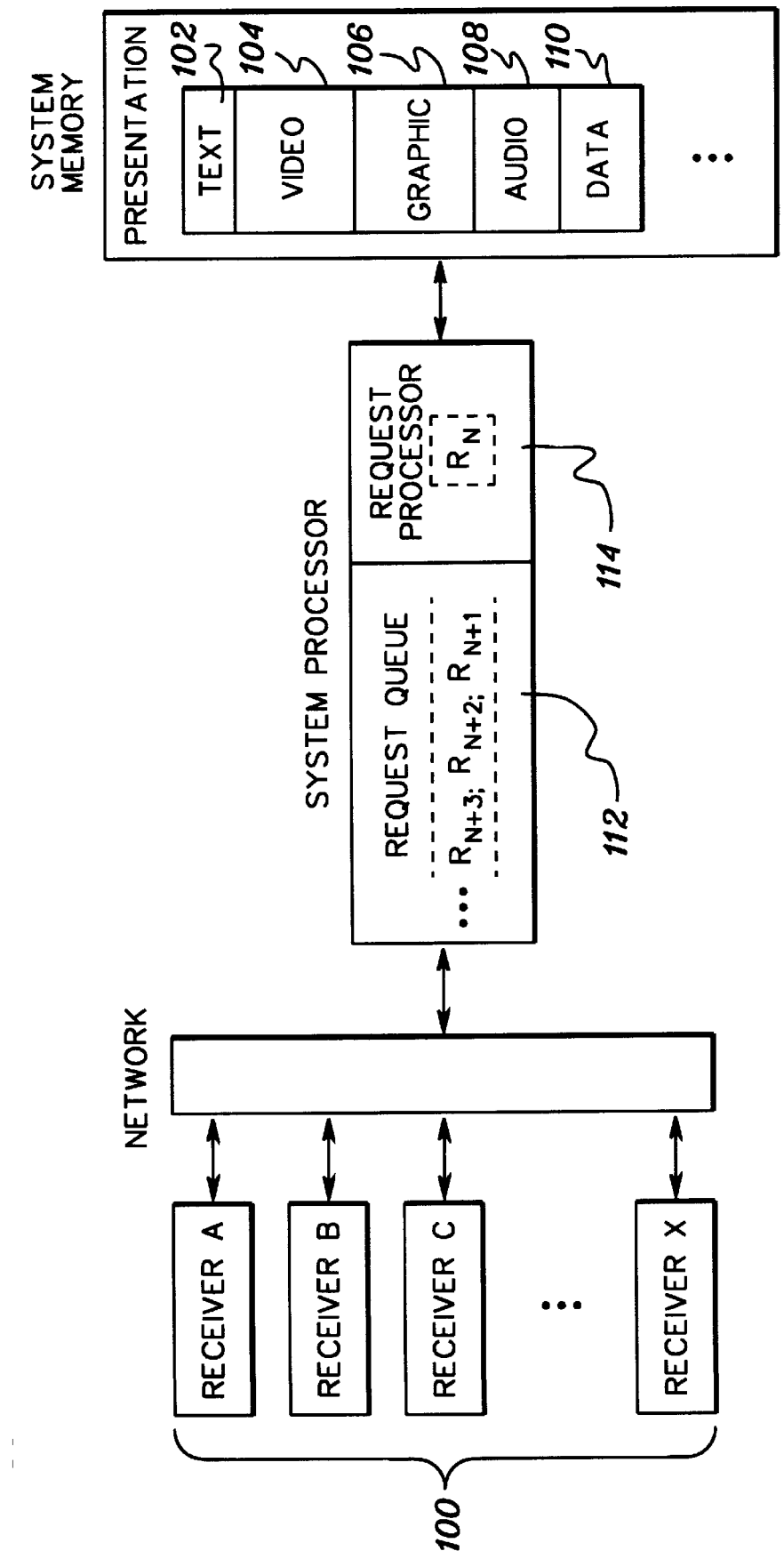
FIG. 1 depicts a server system for providing a digitally encoded presentation in accordance with the teachings of the prior art.

In accordance with present technology, as is illustrated in FIG. 1, requests issued by receivers 100 (Receiver$_A$, Receiver$_B$, etc.) for various pages of the presentation will be queued in a request queue 112 and processed serially by a request processor in the order in which they are received. As the processor responds to a given request, for example, request RN, subsequent requests ($R_{N+1}$, $R_{N+2}$, etc.) remain unattended in the queue. Thus a receiver requesting the relatively short text page 102 of the presentation may be forced to wait while numerous earlier requesters are supplied one-at-a-time with the relatively lengthy video page 104.

Figure 2:
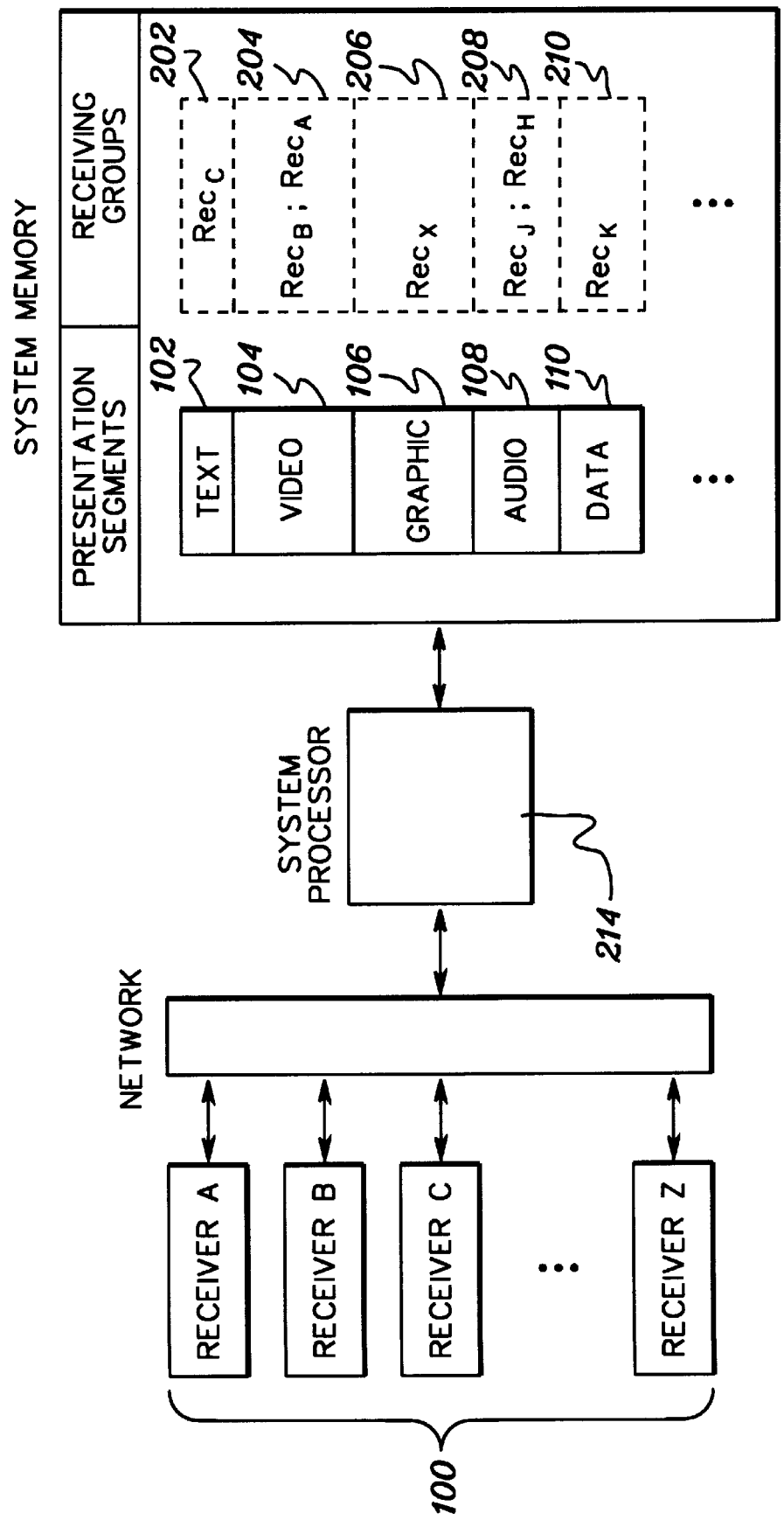
FIG. 2 depicts an example of a data server system for providing a digitally encoded presentation in accordance with the invention.

Reference is now made to FIG. 2, which illustrates a system for providing the exemplary multimedia presentation of FIG. 1 in accordance with the invention. As shown in FIG. 2, system memory includes the discrete pages, referred to in accordance with the invention as "segments", which comprise the presentation. System memory further includes receiving groups 202–210 corresponding to each of the discrete segments of the presentation. Each receiving group includes a list of receivers which have requested the associated segment within a predefined request window. For example, the receiving group 204 for the video segment 104 of the presentation consists of Receiver$_A$ and Receiver$_B$. Receiving groups and their associated segment designations may be stored in system memory in the form of a table. Thus as requests for segments are received they are processed immediately by the system processor 214 by assigning the requester to the appropriate receiving group.

Figure 3:
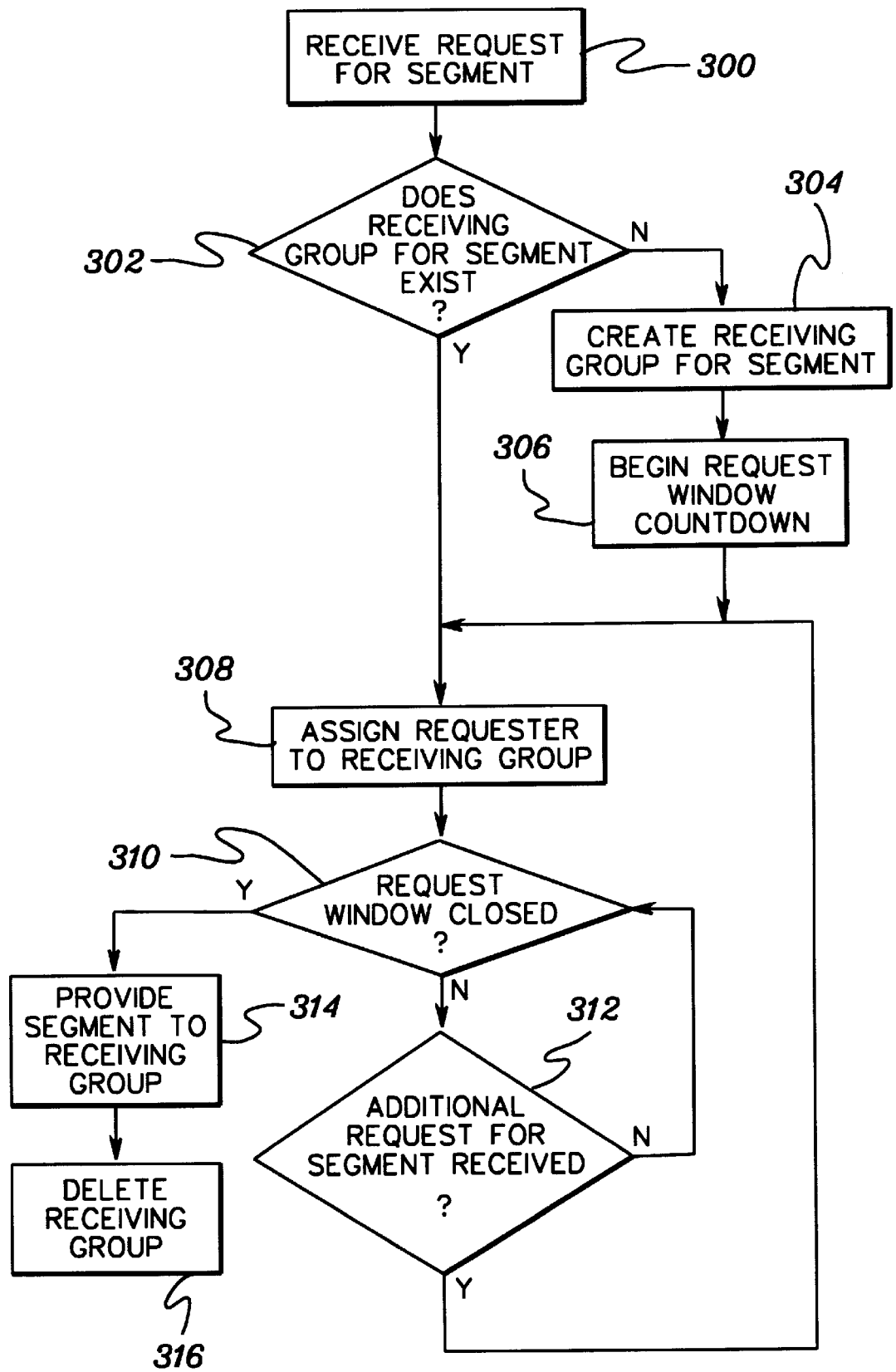
FIG. 3 provides an example of a process implementing the invention in a server system for providing a digitally encoded presentation in accordance with the invention.

An example of a process by which the invention may be implemented in a system such as the exemplary system of FIG. 2 is illustrated in the flow diagram of FIG. 3. As shown in FIG. 3, when the system receives 300 a request for a segment of a digitally encoded presentation, the system determines 302 whether a receiving group exists which is designated to receive the requested segment. If no such group exists, a receiving group for that segment is created 309 and a request window countdown is begun 306. Subsequently, the requester of the segment will be assigned 308 to the receiving group. Thereafter, the system continuously monitors 310 whether the request window has closed, i.e. whether an amount of time equal to the predefined duration of the request window has elapsed since the creation of the receiving group. If an additional request for the segment is received prior to the closing of the request window, the requester will be assigned 308 to the receiving group. Once the request window is closed, the segment is provided 314 to all requesters assigned to the receiving group by means of a multicast. The receiving group is then deleted 316 from system memory. This process may be reinvoked upon the receipt by the system of a further request for the segment of the digitally encoded presentation.

It will be appreciated by those of ordinary skill in the art that the request windows used for various segments of a digitally encoded presentation may be different for each segment of the presentation. For example, the request window for a particular segment of a presentation may be chosen to optimize system performance in view of the relative demand for the segment, the system resources required to distribute the segment, and the amount of delay in receipt of the segment which will be tolerable to users of the system. For example, referring again to the presentation shown in the system memory of FIG. 2, it may be found that a server providing this presentation receives 20 requests per second for the text segment, but only 10 requests per minute for the video segment. Accordingly, it may be beneficial to use a request window of one second for the text segment and a request window of 10 seconds for the video segment. Those of ordinary skill in the art will further appreciate that processes may be developed and implemented to dynamically redefine the request windows utilized for various segments of a digitally encoded presentation to optimize system performance in response to variable system loads.

Thus the invention in general terms may be embodied in a system for providing a digitally encoded presentation which assigns each requester of a predefined segment of a digitally encoded presentation to a receiving group designated to receive that segment, and which multicasts the segment to the members of the receiving group after the termination of a request window period which was commenced upon the creation of the receiving group. The invention may be applied in any system which serves digitally encoded presentations to multiple receivers in a connectionless environment. Such systems may include data base systems, multimedia servers, and video on demand systems. Disclosed below is an example of an implementation of the invention incorporating additional novel features for optimizing the invention for providing video and other linear presentations at the demand of receivers associated with the system.

II. General implementation of the invention for providing linear presentations and particularly for providing video on demand.

The invention as disclosed above may be optimized for providing linear presentations and particularly for providing video on demand. In general terms, such implementations apply the methods disclosed above by providing linear presentations as a sequence of predefined segments of equal duration. For example, a two hour movie may be provided as consisting of 240 consecutive 30 second segments. Such implementations further employ a uniform request window for all segments of the presentation. This request window is equal to the predefined segment duration of the presentation. Returning to the example begun above, the request window for a movie having 30 second segments would be 30 seconds. Such implementations further include multicasting each segment to the receivers of each receiving group through a connectionless environment and automatically incrementing the segment designation of receiving groups so that receiving groups are automatically provided sequentially with the successive segments of the presentation.

Thus, in accordance with the invention, upon receiving a request for a movie, the system will assign the requester to a receiving group for receiving the first segment of the requested movie. The requester will be provided with data for the first segment after a delay time lasting no longer than the duration of the request window. Subsequently the requester's receiving group will automatically be redesignated to be provided with the next successive segment of the movie. The requester will thus be provided with the entire movie from beginning to end. The data serving system on which this embodiment of the invention is implemented will preferably have sufficient processing and throughput capabilities to multicast the data for every segment of the presentation within a period of time which is equal to the presentation's predefined request window. Returning to the example begun above, such a system would be capable of multicasting each of the 240 segments of the movie during the course of each 30 second request window. As such, the presentation is effectively made available to be received beginning every 30 seconds.

A manner in which receiving groups may be provided with first and successive segments of a linear presentation such as a video is illustrated in FIGS. 4a and 4b. FIGS. 4a and 4b each show a generic presentation time line 400 corresponding to a linear presentation and several receiving groups corresponding to various segments 402 of each presentation time line at consecutive first and second times X and X+L. In these Figures, L is equal to the request window duration of the presentation. Further, each of the segments 402 of the presentation has an equal predefined duration L. Thus, for example, if the illustrated presentation is a movie, each segment and its associated request window may be predefined as being 30 seconds in length.

Along the time line of FIG. 4a are illustrated three receiving groups 404, 406, 408 corresponding to three different segments of the presentation. Each receiving group comprises one or more receivers 410 which are associated with the system. It may be inferred that members of each receiving group requested the presentation within the same request window. Assuming again the example of a movie divided into 30 second segments each having 30 second request windows, a new group designated to receive the first segment will form every 30 seconds, and every requester requesting the presentation during a particular 30 second request window will become part of the same group. Thus, for example, from the time line of FIG. 4a it can be inferred that the four members of the left-most receiving group 404 requested the presentation during the same request window.

The time line of FIG. 4b illustrates the same receiving groups and their corresponding segment designations after the passage of a period of time equal to the request window L. Continuing with the example begun above, the time line of FIG. 4b shows receiving groups and their associated segment designations after an interval of 30 seconds from the instance shown on the time line of FIG. 4a. It is seen that each receiving group is now designated to receive the next successive segment in relation to its designated segment on the time line of FIG. 4a. This is preferably accomplished automatically by the system, as discussed in further detail below. In addition, it is further seen in FIG. 4b that a new receiver comprises a new receiving group which is designated to receive the first segment. It may be inferred that this receiver requested the presentation during the request window immediately succeeding that of the left-most receiving group 404 of FIG. 4a.

It will be appreciated that the number of members of a receiving group will be limited only by the connectivity potential of the system implementing this grouping method. The predefined segment length and request window length may be chosen to best suit system needs in view of the expected number of requesters, the number and nature of presentations offered, and system throughput capabilities. It will further be appreciated that presentations provided in this manner need not be prerecorded in their entirety, but may rather be the product of ongoing creation, e.g. a "live" video or audio presentation.

III. A preferred implementation of the invention for providing video on demand

While the method described in Section II is generally applicable to data serving systems for serving linear presentations, additional novel features may be included to provide a preferred embodiment which is optimized for video on demand applications. For example, the system may be provided with the capability to allow users to pause the transmission of a video presentation, or to move forward or backward from a segment being received to a different segment. Further, the system may be provided with the capability to dynamically reconfigure the loads placed upon various cache processors of the system in order to optimize system performance. A novel "share nothing, cache everything" (SNCE) method may also be employed to control data object reading and updating within the system.

Figure 5:
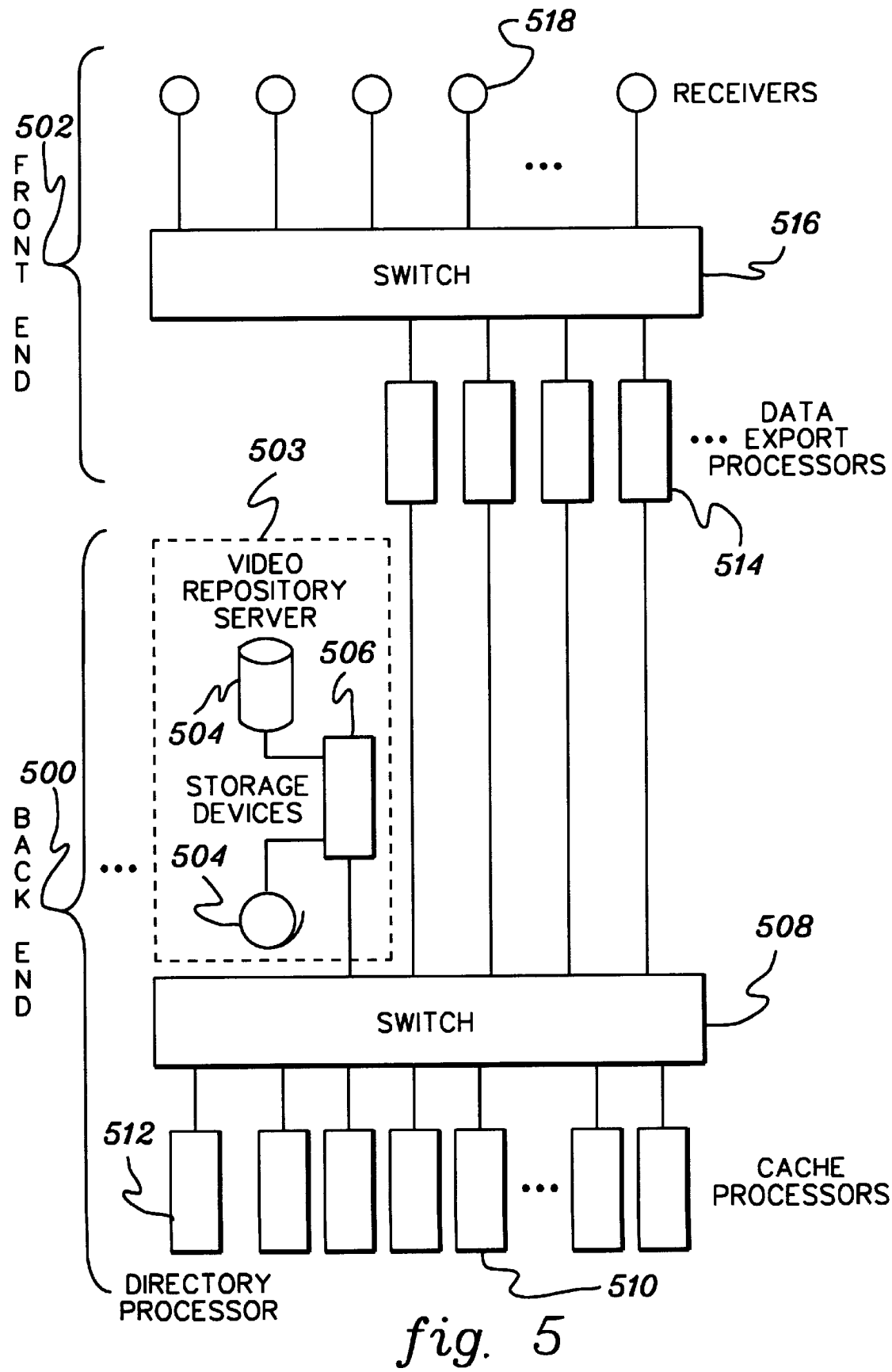
FIG. 5 illustrates an example of a first system embodying the invention.

A. Basic Configuration of a System Embodying the invention optimized for providing video on demand A first example of a system embodying the invention which is optimized for video on demand applications is illustrated in FIG. 5. This system generally consists of a back end portion 500 for generating and managing video presentation data and a front end portion 502 for distributing video presentation data to receivers. The back end portion 500 may include a repository 503 of video presentations stored on various storage devices 504 such as magnetic tapes, hard discs, volatile and/or nonvolatile semiconductor memory, and laser discs. The storage devices are accessed by one or more video repository servers 506. The one or more video repository servers 506 interface with a back end switching network 508 such as an Asynchronous Transfer Mode (ATM) switching network. The back end switching network 508 provides a connectionless environment for all processors coupled thereto and facilitates multicasting. The back end switching network 508 further interfaces with a plurality of cache processors 510 which function as the back end repositories for furnishing presentation data to the front end. One cache processor is designated as a directory processor 512 which primarily performs system-wide control and data management functions.

The front end portion 502 of the exemplary system illustrated in FIG. 5 includes a plurality of data export processors 514 which interface with the back end switching network 508 and with a front end switching network 516. The front end switching network provides a connectionless multicasting environment between the data exporters 514 and receivers 518. Each receiver is assigned to communicate with a specific data exporter of the front end. Receivers may take many forms but will be characterized by an internal processor, memory, and the ability to decode data provided by the data exporters to produce a video display. Thus a receiver may comprise a personal computer or a dedicated receiving and decoding unit (sometimes generically referred to as a "set top box").

Figure 6:
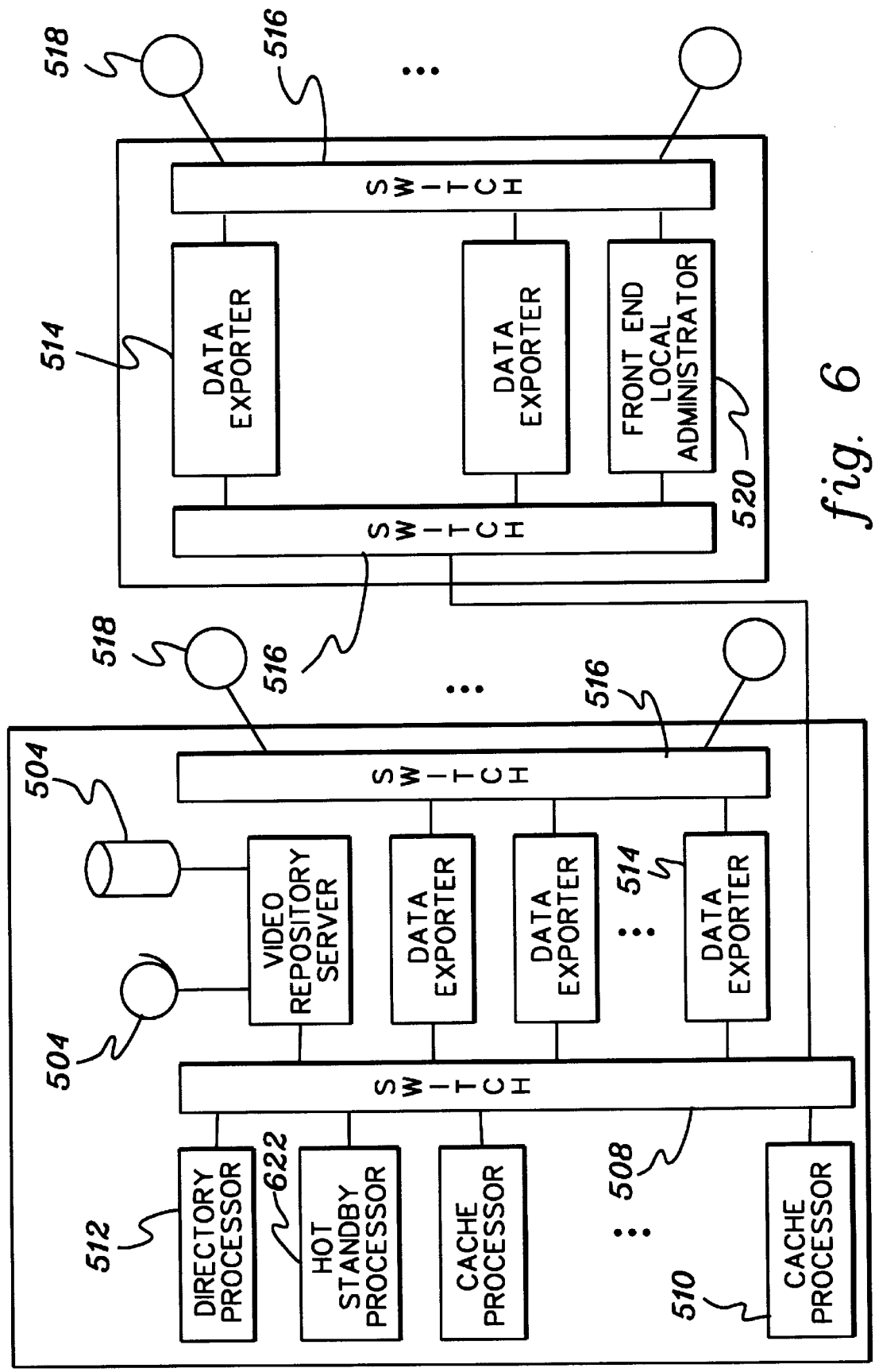
FIG. 6 illustrates an example of a second system embodying the invention including a data exporter complex locally managed by a front end local administrator.

An alternative example of a video on demand system embodying the invention is illustrated in FIG. 6. This embodiment is similar to that of FIG. 5. However, in this embodiment a portion of the front end is managed locally by a front end local administrator 620, which may undertake management functions such as routing requests from local receivers to local data exporters and balancing the transmission load among local data exporters.

The embodiment of FIG. 6 further includes an additional processor in the back end which is designated as a "hot standby" processor 622, a function which is well known in the art. A hot standby processor may provide backup for the directory processor, one or more of the video repository servers, or one or more of the cache processors, as dictated by the needs of the system.

In systems such as those exemplified in FIGS. 5 and 6, the vast amounts of data required to represent a segment of a video may make it preferable to provide each segment as a number of individual portions when transmitting from a cache processor to a data exporter or from a data exporter to a receiver. Thus, to continue with the example begun above in Section II, it may be assumed that each 30 second segment of a movie presentation will be provided from a cache processor to a data exporter or from a data exporter to a receiver as ten individual portions each having a duration of three seconds. The three second portion duration is chosen to minimize the amount of buffer memory required in receivers associated with the system, as discussed in further detail below.

To minimize the amount of control processing necessary to facilitate the transmission of data portions from cache processors to data exporters and from data exporters to receivers, it is preferable to provide data from the cache processors and data exporters in "push" mode. In push mode, a single action initiates an ongoing data output process and the output process continues until purposefully terminated. The use of push mode output minimizes the necessary interaction between system components. For example, in such a system, a data exporter may request the transmission of a presentation segment from a cache processor by simply notifying the cache processor that it wishes to read the segment. The cache processor will thereafter push the segment data to the data exporter in three second portions until all segment data has been supplied or the supply of data is purposefully terminated by the data exporter. Similarly, a receiver may receive a whole presentation from a data exporter by simply issuing a request to a data exporter for the presentation. The data exporter will subsequently push segment data portions to the receiver as they are received from cache processors until such time as the presentation ends or the transmission of data is purposefully terminated or altered by the receiver. In the remaining discussions of system components and functions in accordance with the exemplary systems illustrated in FIGS. 5 and 6, it is assumed that all cache processors and data exporters operate in push mode.

Figure 7:
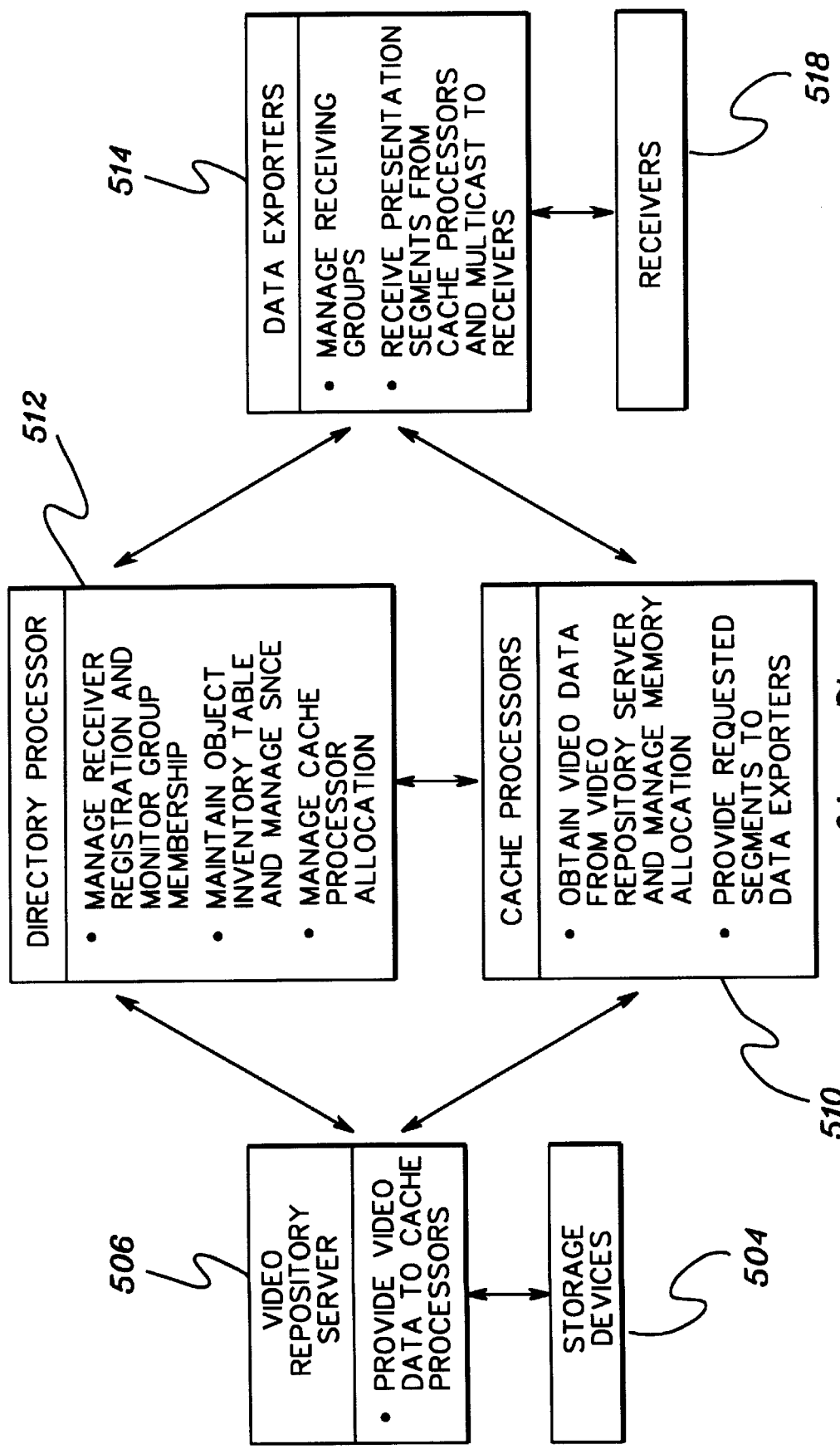
FIG. 7 illustrates in generic form several components of the exemplary systems of FIGS. 5 and 6 and the control and processing functions allocated to each of those components.

Optimal operation of systems such as those illustrated in FIGS. 5 and 6 may be achieved through specific allocation of various control and processing functions to various system components. FIG. 7 illustrates in generic form several of the major components of the exemplary systems of FIGS. 5 and 6 and the control and processing functions allocated to each of these components. As related in FIG. 7, the directory processor 512 manages the registration of individual receivers 518 with the system for purposes of authorizing and keeping track of the receivers which are using the system. The directory processor 512 further monitors receiving group membership as reported by the data exporters 514. In addition, the directory processor 512 maintains an inventory of data objects which are available to other entities in the system, and manages SNCE and cache processor allocation.

As further shown in FIG. 7, the video repository server 506, which communicates with the directory processor 512 and cache processors 510, is responsible for accessing presentations stored on the system storage devices 504 and for providing video data to the cache processors 510. The cache processors 510 may communicate with the video repository server 506, the directory processor 512, and the data exporters 514. A cache processor 510 is responsible for obtaining video data from the video repository server 506 and for providing segments to data exporters 514 at the request of the data exporters. A segment may be provided to more than one data exporter simultaneously by multicasting. The cache processors 510 are further responsible for managing the amount of a given presentation which will be stored in cache memory.

The data exporters 514, as illustrated in FIG. 7, are responsible for managing receiving groups, which may include creating groups, adding or deleting members, changing the status of group members, and altering a group's segment designation. The receiving groups managed by a data exporter will be comprised of receivers which interact with the system through that particular data exporter. The data exporters 514 are also responsible for requesting segments of presentations from cache processors 510 and for transmitting segment data to receivers 518. Data may be transmitted to more than one receiver simultaneously by multicasting.

The various processes which may be implemented on components of systems such as those illustrated in FIGS. 5 and 6 to provide the functions illustrated in FIG. 7 in the context of a video on demand system are discussed below in relation to the remaining Figures. The components and performance specifications of an exemplary system configured to provide video on demand services for a predetermined number of receivers are then discussed.

B. Operation of Data Exporters

Figure 8A:
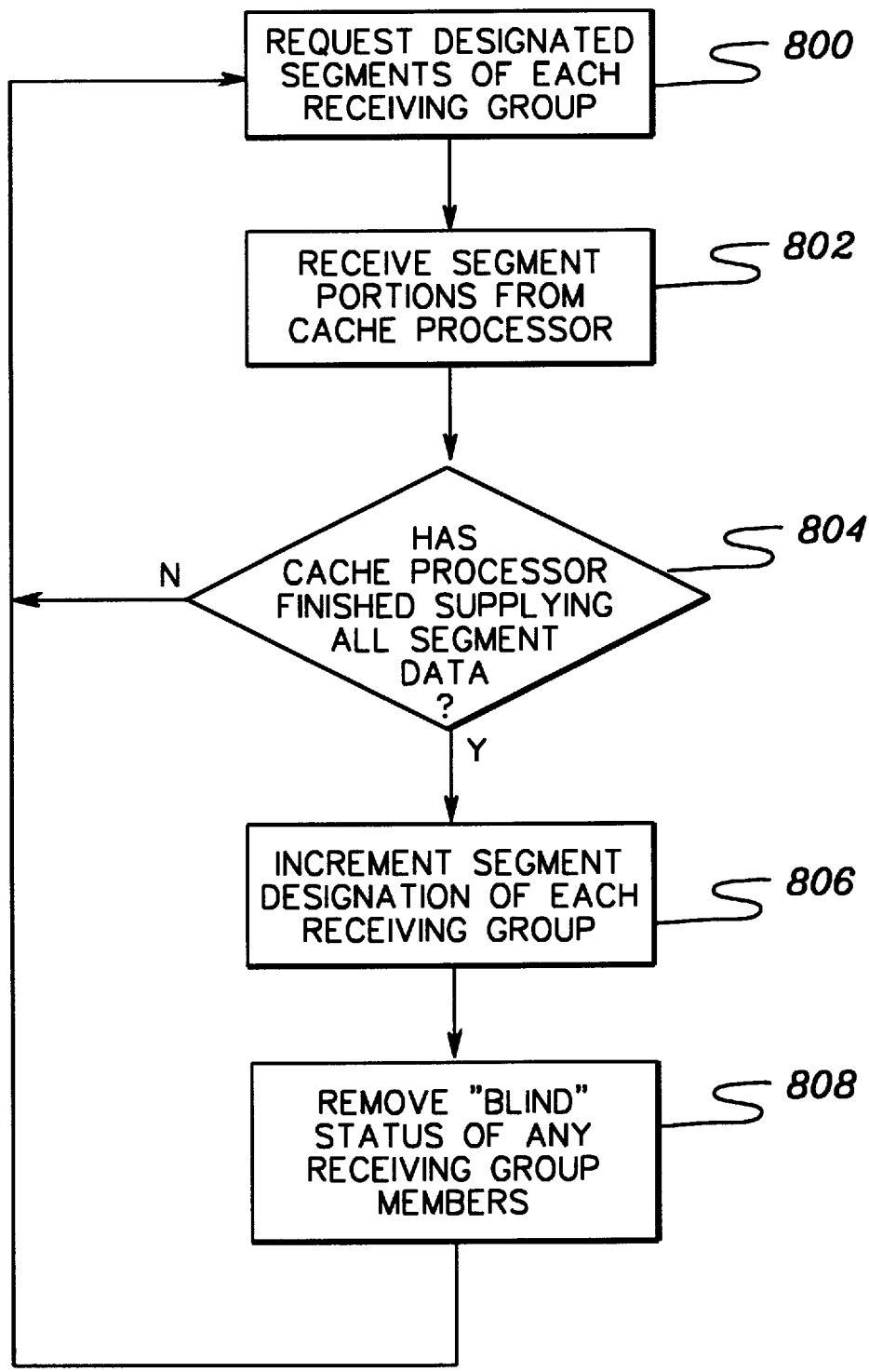
FIG. 8a provides an example of process flow in a data exporter of a system embodying the invention for automatically providing successive segments of a presentation.
Figure 8B:
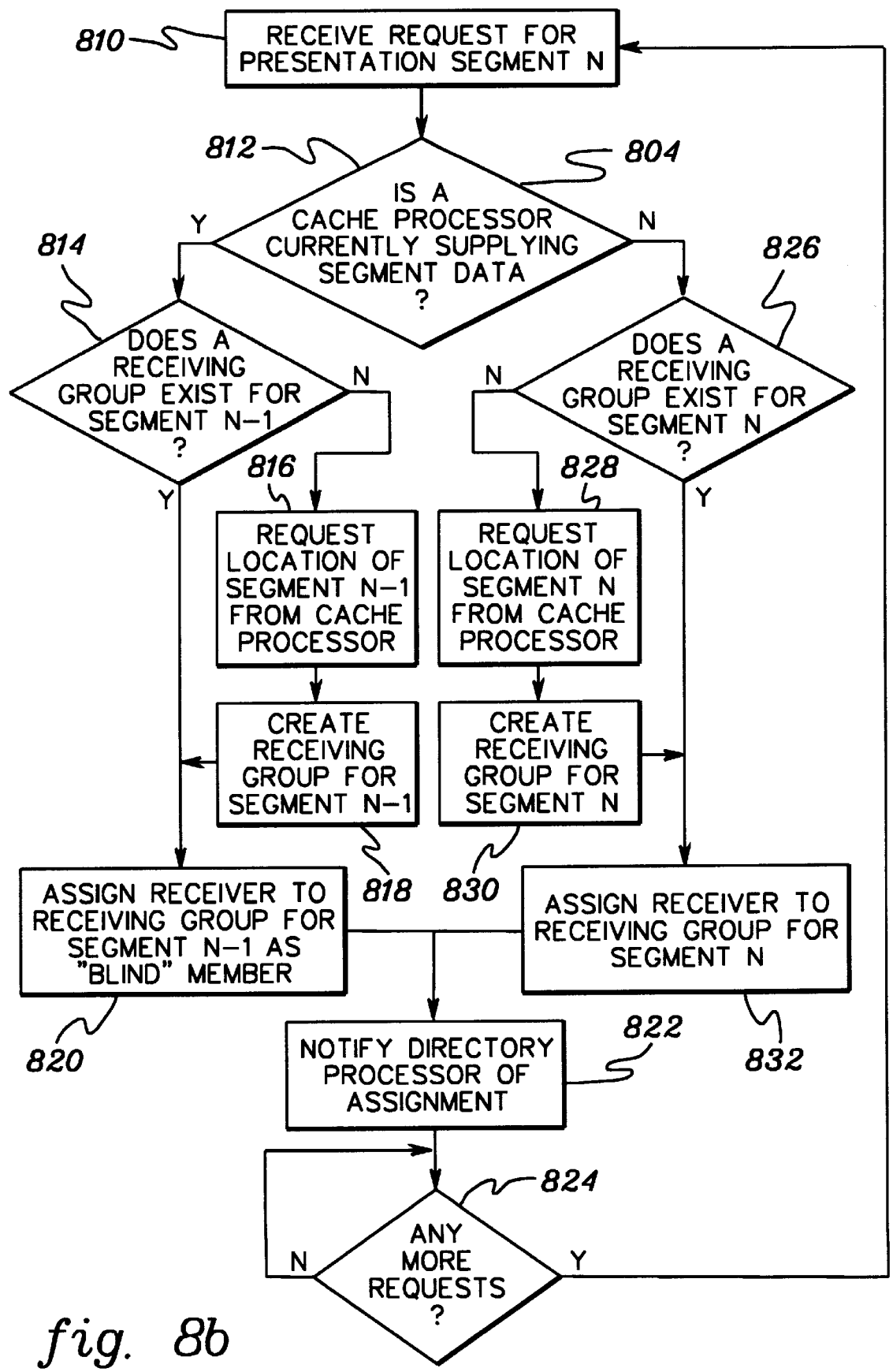
FIG. 8b provides an example of process flow in a data exporter of a system embodying the invention for processing requests for a presentation.

In accordance with the preferred embodiment of the invention, data exporters are responsible for automatically providing successive segments of a presentation to members of receiving groups and for managing receiving group membership. A manner in which a data exporter may provide successive segments of a presentation to receiving groups is illustrated in FIG. 8a. An example of how a data exporter may manage the creation of new receiving groups and the assignment of receivers to receiving groups is illustrated in FIG. 8b. In the discussion of FIGS. 8a and 8b, it will be assumed for purposes of illustration that requests received from receivers are requests to receive a whole video presentation, and that as such the request is treated as a request to receive the presentation beginning from the first segment. However, it will be apparent that the illustrated processes may be used to create any new receiving group or to add a member to any existing receiving group irrespective of the segment associated with that group. Thus the illustrated processes may also be used to process a request to resume a presentation from a segment during which it was paused, or a request to restart the presentation beginning at a specified segment. These two options are discussed in greater detail in relation to FIGS. 9–12.

As shown in FIG. 8a, the process begins with a request 800 to a cache processor from the data exporter to read the designated segments of its receiving groups. These segments may be determined through reference to a receiving group table maintained and stored by the data exporter. Responsive to the data exporter's request, segment data will subsequently be pushed from the cache processor in three second portions and received 802 by the data exporter. When it is determined 804 that the cache processor has finished supplying all portions of all segments of the presentation, the data exporter increments 806 the segment designation of each group in the receiving group table and removes 808 the "blind" status of any group member. Blind status prevents a group member from receiving segment data from the data exporter. The purpose of blind status will be explained in relation to FIG. 8b. After incrementing segment designations and removing blind status, the data exporter again requests 800 reading of all of the designated segments of its receiving groups from the cache processor.

An example of group membership management in a data exporter in accordance with the process of FIG. 8a is shown in FIG. 8b. When a data exporter receives 810 a request from a receiver to provide a presentation beginning with a segment N, for example, the first segment of the presentation, the data exporter determines 812 whether segment data for that segment is currently being supplied by a cache processor. If the cache processor is currently supplying data, the data exporter will act to add the requester as a blind receiver to a group which is designated to receive the segment N–1, so that once the cache processor has finished supplying data, the requester's group designation will incremented to N and the requester will lose its blind status. Accordingly, the data exporter will determine 814 whether a receiving group for segment N–1 exists. If no such group exists, the location of segment N–1 in cache memory is requested 816 from the directory processor and a group designated to receive segment N–1 is created 818. Where the requester has requested the first segment of a presentation, the group will be designated to receive a fictitious segment 0 which is assumed to exist in the same cache memory area as segment 1. Once a receiving group for segment N–1 is determined to exist, the receiver is assigned 820 to that group, the directory processor is notified 822 of the receiver's assignment, and the data exporter monitors 824 for further requests.

Alternatively, if it is determined 812 that segment data is not currently being supplied for that segment by a cache processor, the data exporter will act to simply assign the receiver to the group designated to receive the requested segment, since group designations will have already been incremented and the receiver will receive the appropriate segment data when a cache processor begins to supply the segment data again. Accordingly, the data exporter will determine 826 whether it has a receiving group for segment N. If no such group exists, the location in the cache processors of segment N is requested 828 from the directory processor and a group designated to receive segment N is created 830. Once a receiving group for segment N is determined to exist, the receiver is assigned 832 to that group, the directory processor is notified 822 of the receiver's assignment, and the data exporter monitors 824 for further requests.

Figure 9:
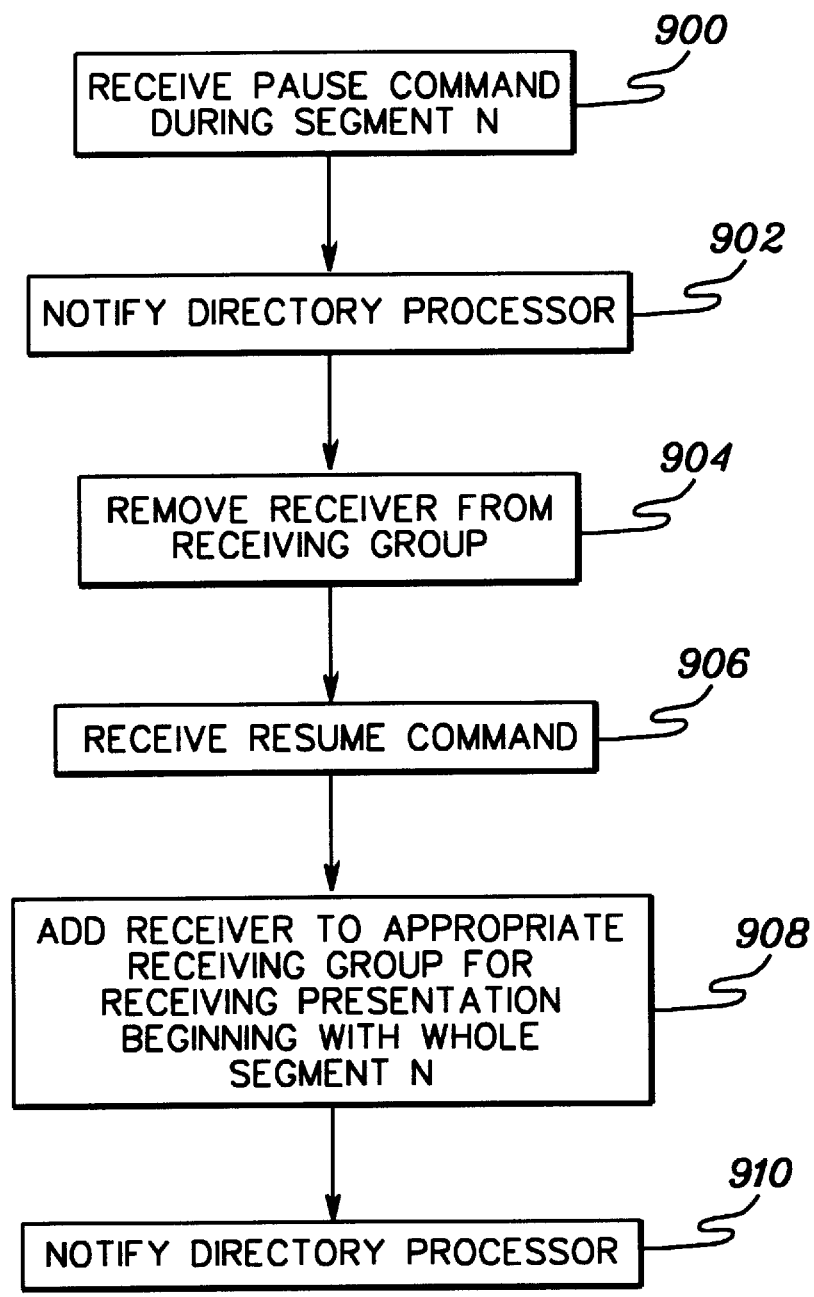
FIG. 9 provides an example of process flow in a data exporter of a preferred embodiment of the invention for responding to pause and resume commands from a receiver.

Through its control of receiving group membership, data exporters may also provide basic "stop", "pause", "forward" and "reverse" functions. It may be inferred that a data exporter may stop the transmission of a presentation to a given receiver by removing that receiver from its receiving group. FIG. 9 shows an example of a process for providing a pause in data transmission to a receiver. When the data exporter receives 900 a pause command during a segment N, the directory processor is notified 902. The receiver issuing the pause command is then removed 904 from its receiving group. This may be accomplished by updating the receiving group table to remove the receiver from the receiving group record. Upon being removed from a receiving group, the receiver will not receive further data multicasts. Subsequently, when a resume command is received 906, the receiver is added 908 to a receiving group which will next receive the entirety of segment N. The assignment of the receiver to the appropriate receiving group is controlled in the manner described in accordance with FIG. 8b. Specifically, the data exporter determines 812 whether the cache processor is currently supplying data. If data is currently being supplied, the receiver is assigned 832 as a blind receiver to a receiving group currently receiving segment N–1. If data is not currently being supplied, the receiver is assigned 820 to a receiving group designated to receive segment N. Returning to FIG. 9, upon being placed in a group, the directory processor is notified 910 of the receiver's new group and segment designation.

Figure 10C:
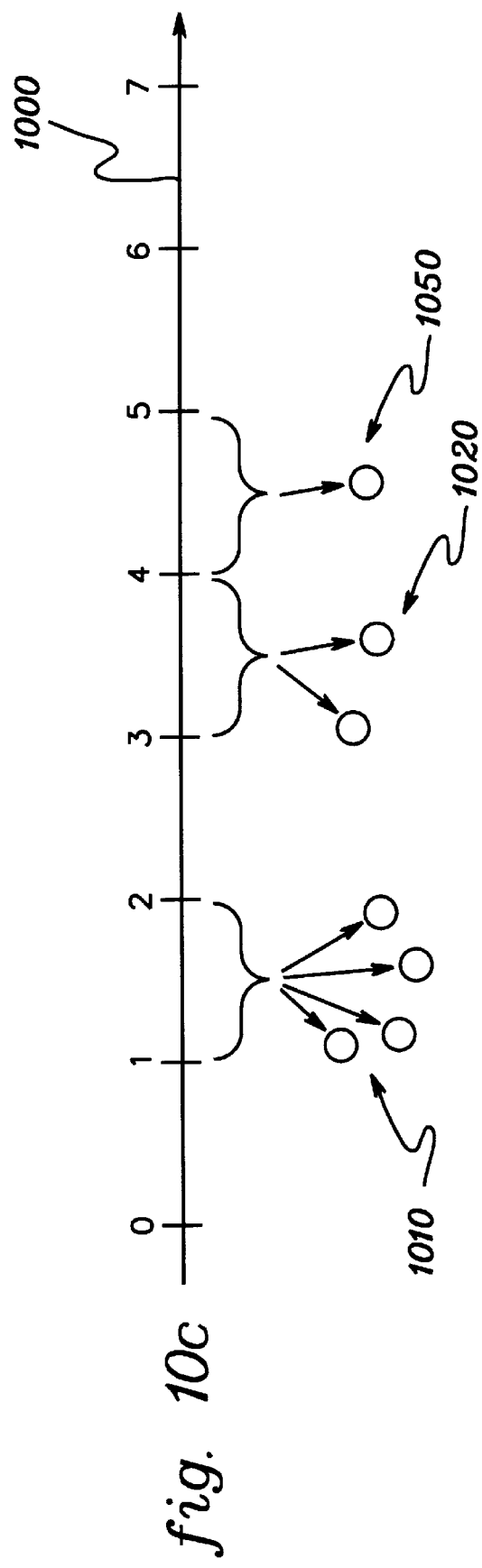
Figure 10D:
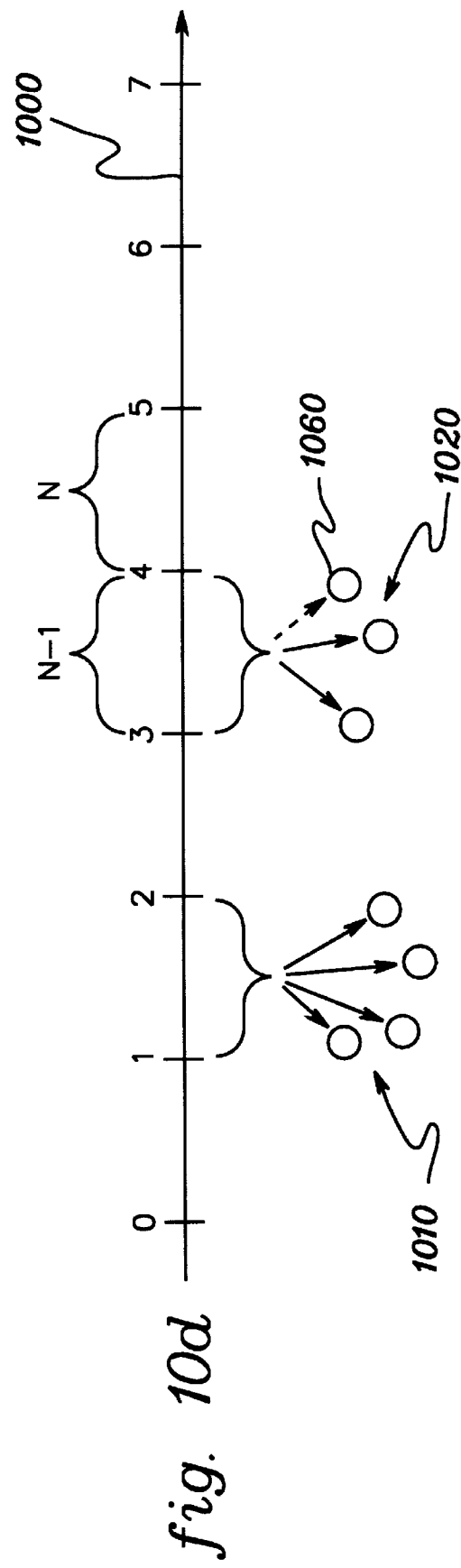

The effects of this process on receiving group membership are illustrated in association with the time lines 1000 depicted in FIGS. 10a–10d. The time line of FIG. 10a illustrates three receiving groups 1010, 1020, 1030. The time line of FIG. 10b illustrates the same groups after a pause command from the sole member of the right-most receiving group 1030 has been processed. The receiver is no longer a member of a receiving group for receiving its previously designated segment N and therefore does not receive segment data for segment N. In the illustrated instance, it will be noted that the receiver issuing the pause command was the only member of its group prior to issuing the command, and that the group is therefore effectively eliminated when the command is processed. FIG. 10c shows group membership if the resume command is processed after group segment designations have been incremented once but before the cache processor has begun to supply segment data again. In such an instance the receiver will simply be assigned to a receiving group 1050 designated to receive the segment during which the pause command was received. In contrast, FIG. 10d shows group membership if the resume command is processed after group segment designations have been incremented once and after the cache processor has begun to supply data again. In such an instance the receiver is assigned as a blind receiver 1060 to a receiving group 1020 designated to receive the segment N−1 immediately preceding the segment during which the pause command was received. As previously illustrated in FIG. 8a, when segment designations are next incremented the receiver's blind status will be removed and the receiver will receive data for the segment N along with the rest of its group.

Figure 11:
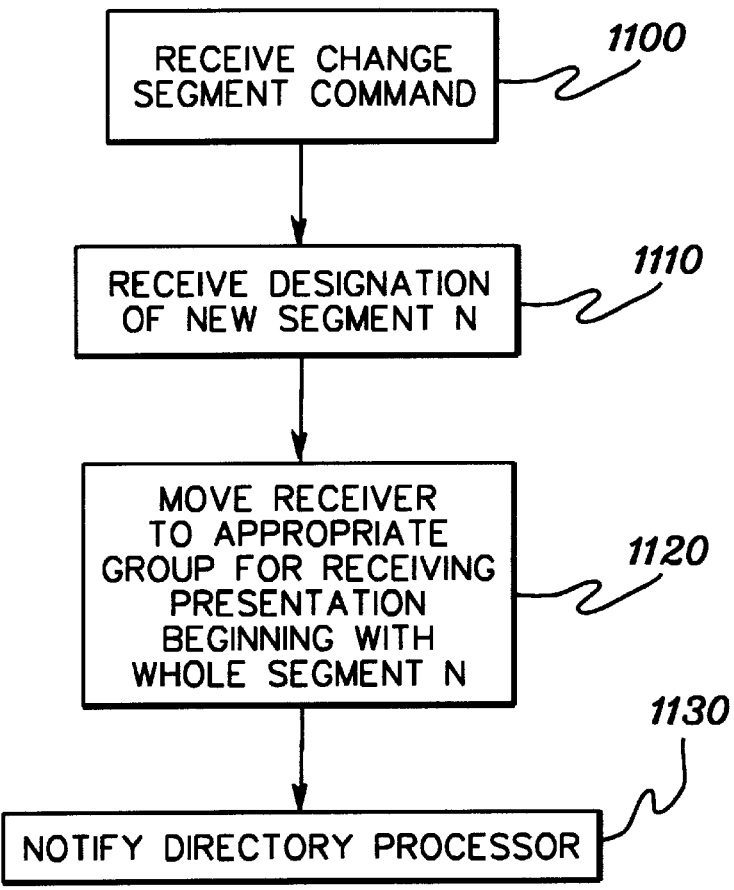
FIG. 11 provides an example of process flow in a data exporter of a preferred embodiment of the invention for responding to a "change segment" command from a receiver.

The directory processor may similarly provide a "change segment" function to receivers which can be used to approximate a "forward" or "reverse" function. FIG. 11 shows an example of a process for changing the segment designation of a receiver. When the data exporter receives 1100 a change segment command and receives 1110 a designation of a new segment N from a receiver, the receiver issuing the command is moved 1120 from its receiving group to an appropriate receiving group for receiving the entirety of segment N. The movement is processed in the manner discussed in relation to FIG. 8b. Specifically, the data exporter determines 812 whether the cache processor is currently supplying data. If data is currently being supplied, the receiver is assigned 820 as a blind receiver to a receiving group currently receiving segment N−1. If data is not currently being supplied, the receiver is assigned 832 to a receiving group designated to receive segment N. Upon being placed in a group, the directory processor is notified 1130 of the receiver's new group and segment designation.

Figure 12A:
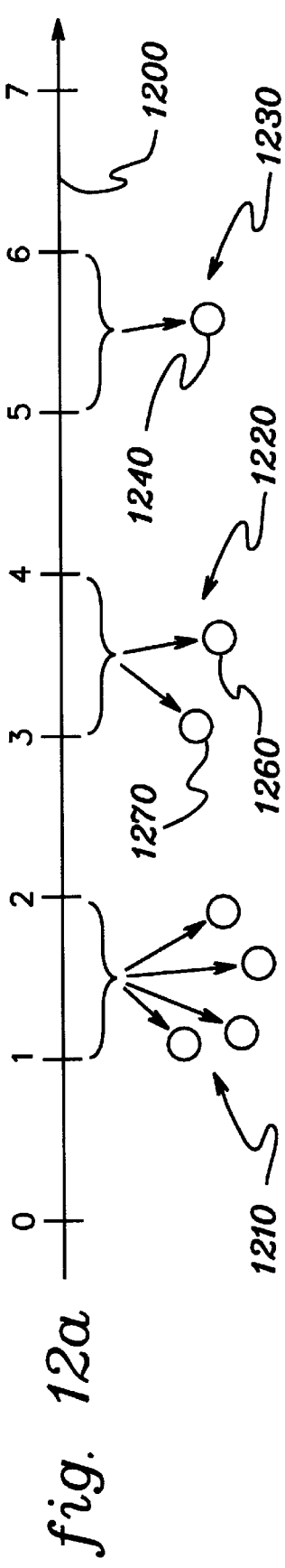
FIGS. 12a–12c depict the reassignment of receivers issuing change segment commands to new receiving groups under various circumstances by a data exporter of a preferred embodiment of the invention.
Figure 12B:
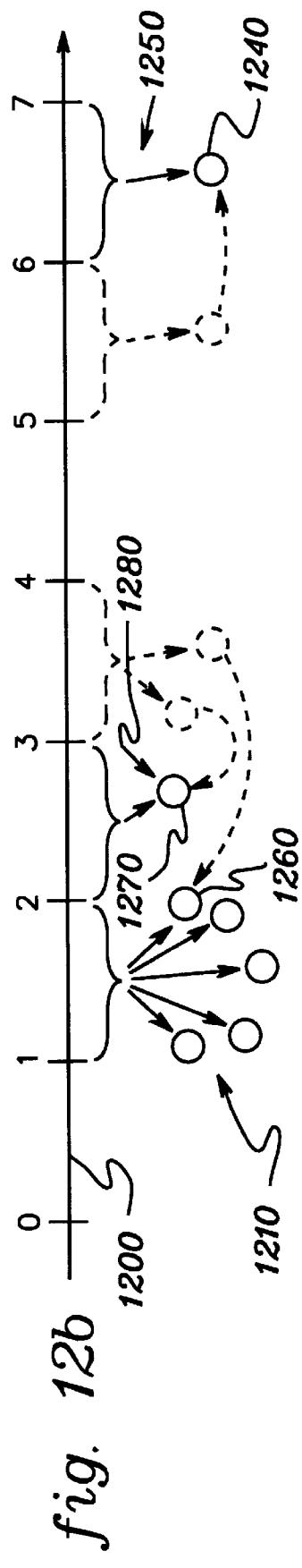
Figure 12C:
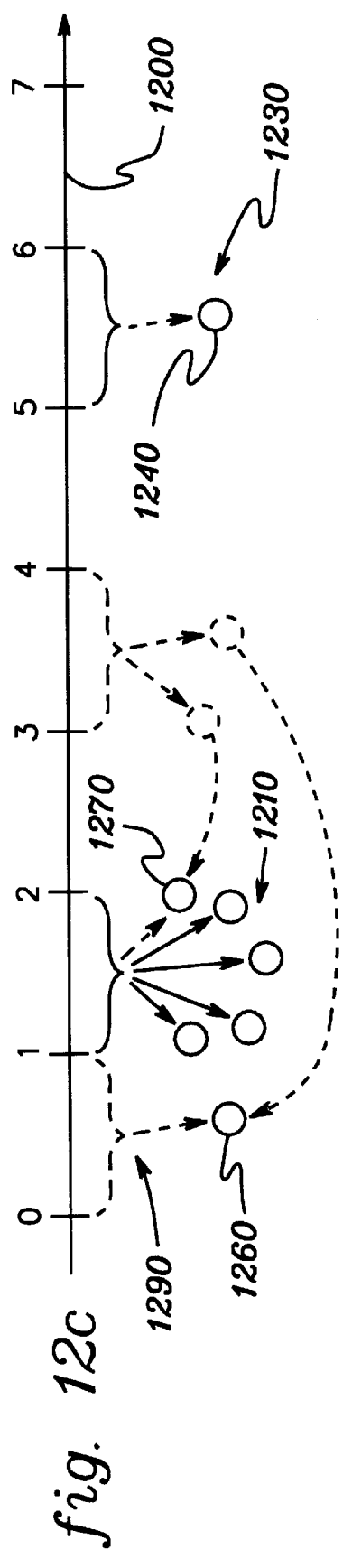

Effects on receiving group membership resulting from the issuance of various change segment commands are illustrated in association with the time lines 1200 of FIGS. 12a–12c. The time line of FIG. 12a illustrates three receiving groups 1210, 1220, 1230. The time line of FIG. 12b illustrates the same groups after a change segment command has been processed for three members of the three groups of FIG. 12a, where each of the change segment commands is processed after group segment designations have been incremented once but before the cache processor has begun to supply segment data again. In such an instance the receivers will simply be assigned to receiving groups designated to receive the segments which they respectively designated. Specifically the sole member 1240 of the right-most group, which has requested to be moved forward by one segment, is assigned to a new receiving group 1250 designated to receive the next successive segment. It will be noted that this receiver was the only member of its previous receiving group 1230, and so its issuance of a change segment command effectively results in the elimination of its previous group. Similarly, the receivers 1260 and 1270 of the center-most group 1220 of FIG. 12a have requested to be moved backward two and one segments, respectively, resulting in the addition of a receiver 1260 to the left-most group 1210 of FIG. 12a, the creation of a new receiving group 1280, and the effective elimination of the receivers' previous receiving group 1220.

In contrast, FIG. 12c shows group membership if the change segment commands are processed after group segment designations have been incremented once and after the cache processor has begun to supply segment data again. In such an instance the receivers are assigned as blind receivers to receiving groups designated to receive the segments immediately preceding their respective designated segments. Specifically the sole member 1240 of the right-most group 1230, which has requested to be moved forward by one segment, is removed from its group 1230 and then reassigned there as a blind receiver. Similarly, the receivers 1260 and 1270 of the centermost group 1220 of FIG. 12a have requested to be moved backward two and one segments, respectively, resulting in the creation of a new group 1290 at the first segment to which a receiver 1260 is added as a blind receiver, and the addition of the other receiver 1270 to the left-most group 1210 of FIG. 12a as a blind receiver. When segment designations are again incremented each receiver's blind status will be removed and each receiver will begin to receive segment data along with the rest of its group.

Figure 13:
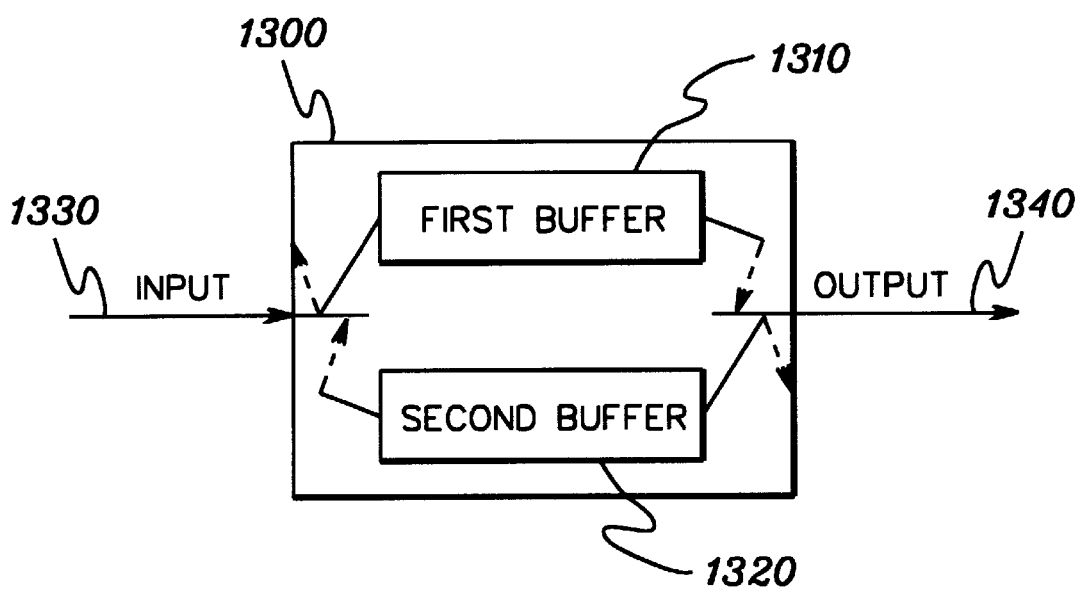
FIG. 13 illustrates a data exporter including first and second buffers and input and output couplings in accordance with a preferred embodiment of the invention.
Figure 14:
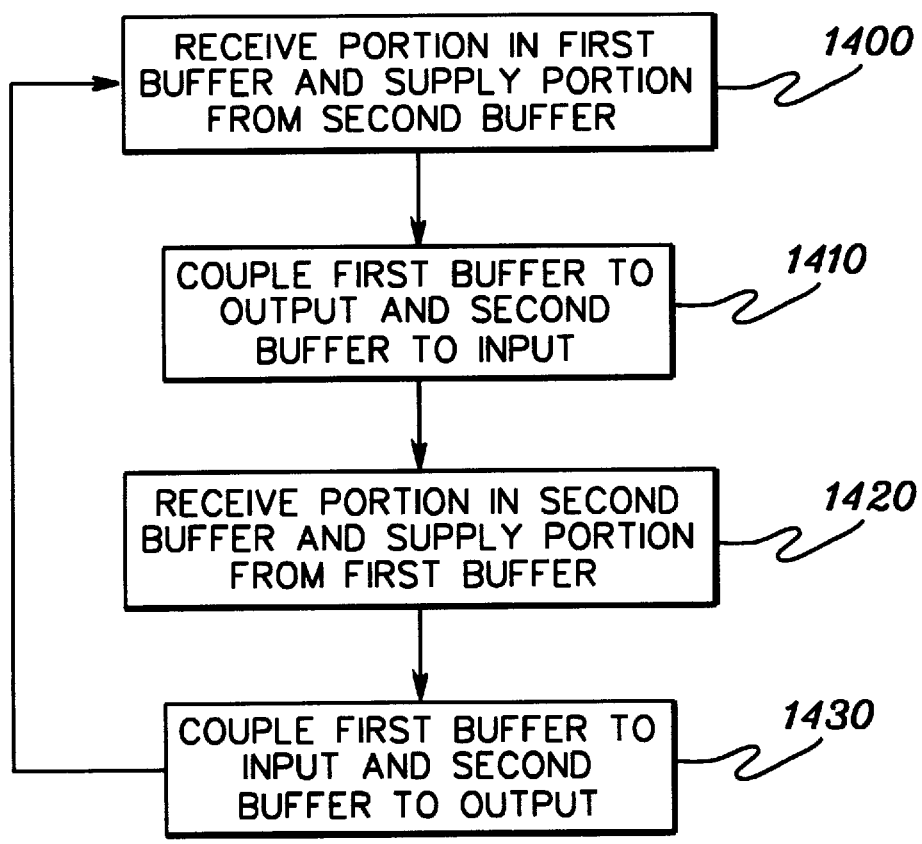
FIG. 14 provides an example of process flow in a data exporter as illustrated in FIG. 13.

The specific manner in which segment data is provided by a data exporter to receivers of a receiving group may vary depending upon system performance specifications. It has already been stated that it is desirable to provide data to receivers in a push mode. A particular data exporter design and an associated method of operation which are optimized for video on demand applications are illustrated in FIGS. 13 and 14, respectively. FIG. 13 illustrates a basic internal configuration which is preferably employed in data exporters of systems embodying the invention. In this configuration, a data exporter 1300 comprises first 1310 and second 1320 buffers which are alternately coupleable to the input 1330 and the output 1340 of the data exporter. The buffer sizes are chosen to be of sufficient size to receive segment portions of predetermined duration, the segment portions being dictated by the buffer capacity of the receivers. For example, if a receiver buffer can reliably hold three seconds of data, the portion size for transfer from the data exporter to the receiver may be chosen to be three seconds.

As illustrated in FIG. 14, operation of the data exporter will comprise receiving 1400 a portion of a presentation segment in the first buffer while supplying a portion of a presentation segment from the second buffer, and then coupling 1410 the first buffer to output and the second buffer to input. Subsequently, a portion of a presentation segment is received 1420 in the second buffer while a portion of a presentation segment is supplied from the first buffer. The first buffer is then coupled 1430 to input while the second buffer is coupled to output, and the process is begun again.

This method and the buffer configuration which facilitates it are preferred because they achieve a substantial reduction in the amount of memory space required by a data exporter. For example, if a presentation is divided into 30 second segments, and each segment is provided in three second portions, the data exporter needs only to hold six seconds of data at any one time to provide enough data for the receiver to provide a continuous presentation.

C. Operation of Cache Processors

As discussed above, the data exporter receives presentation segment data by requesting presentation segment data from a cache processor which contains the presentation segment. This requires that the cache processor contain the appropriate requested segment data and that the cache processor has a reliable method for providing the segment to the data exporter. Methods for fulfilling these requirements are discussed in relation to FIGS. 15a–15i.

Figure 15A:
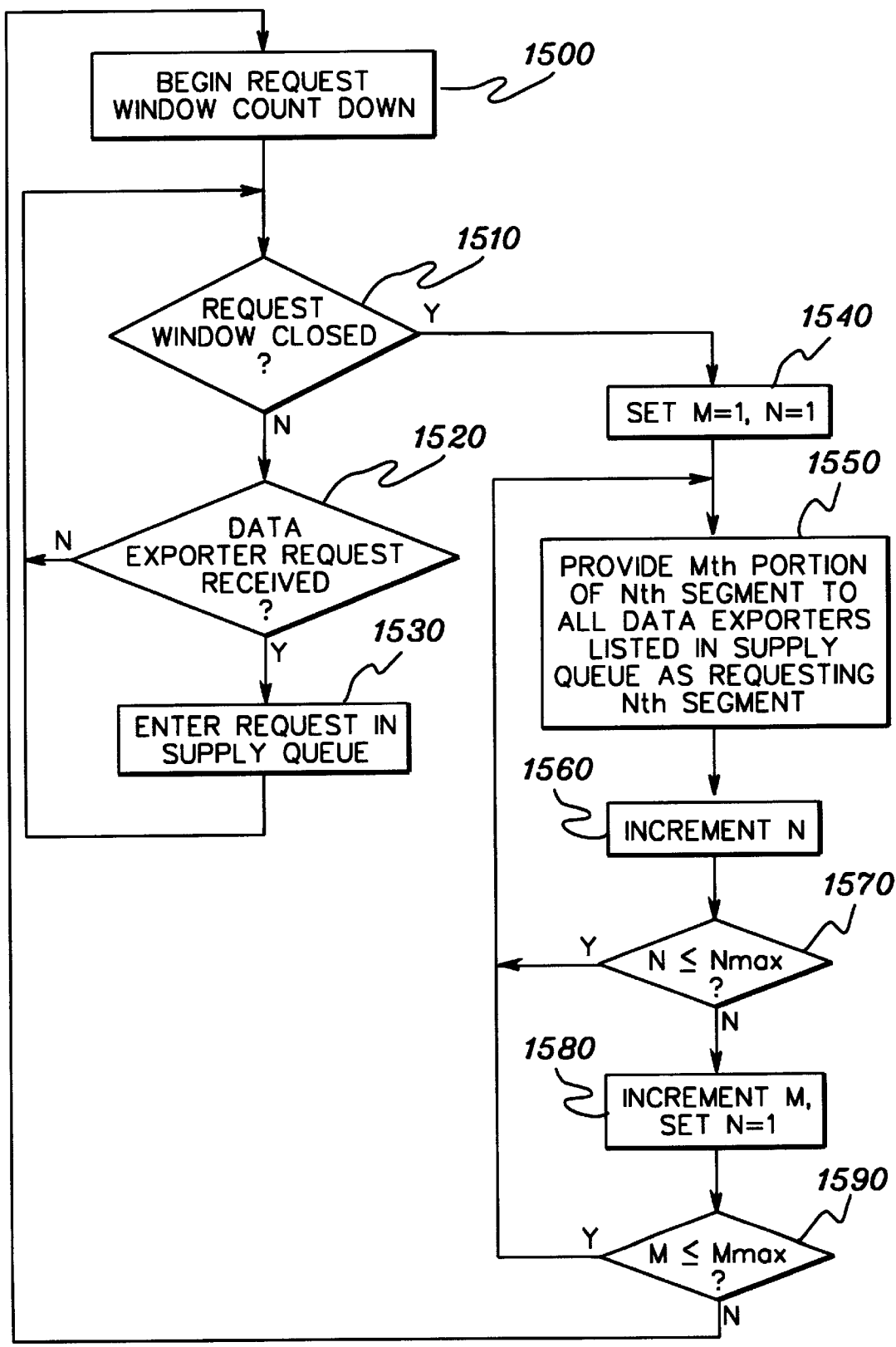
FIG. 15a provides an example of process flow in a cache processor of a preferred embodiment of the invention for supplying segments to data exporters.

FIG. 15a illustrates an example of process flow in a cache processor for providing segments of a presentation to data exporters requesting those segments. In general terms, the process involves providing portions of each requested segment of the presentation such that every portion of every requested segment has been provided within a time L, where L is the duration of a predefined segment duration and request window. Thus, continuing with the example used above, if a presentation is a 2 hour movie partitioned into 240-30 second segments, and each segment is to be provided as ten-three second portions, then the first portion of every segment is provided, the second portion of every segment is provided, &c., until every portion of every segment has been provided.

Referring specifically to FIG. 15a, the cache processor begins this process by beginning 1500 a request countdown which defines the period of time which must elapse prior to the beginning of its next data transmission period. The cache processor then continuously alternately checks 1510 whether the request window has closed, meaning that the countdown period has elapsed, and whether 1520 any requests for segments have been received from a data exporter. When a request is received from a data exporter before the closing of the request window, the request is entered 1530 in the cache processor's supply queue. The supply queue may be a table correlating each segment held in cache memory with each data processor requesting that segment.

When it is determined that the request window has closed, the cache processor sets 1540 two counters M and N, where M signifies a current portion to be provided and N signifies a current segment to be provided. The cache processor then provides 1550 the Mth portion of the Nth segment of the presentation. This portion is provided as a data packet addressed to each requesting data processor and identifying the presentation segment and portion. Thus the data packet will be recognized when pushed to the data exporter. After pushing this packet, the cache processor increments 1560 N, and again provides 1550 the Mth portion. When the maximum number $N_{max}$ of segments held in the cache processor memory is determined 1570 to have been reached, M is incremented 1580 and the Mth portions of each segment are again provided 1550. After the $M_{max}$th portion of each segment is determined 1590 to have been provided, the cache processor begins a new countdown 1500 and returns to processing data exporter requests until the countdown ends again.

Figure 15B:
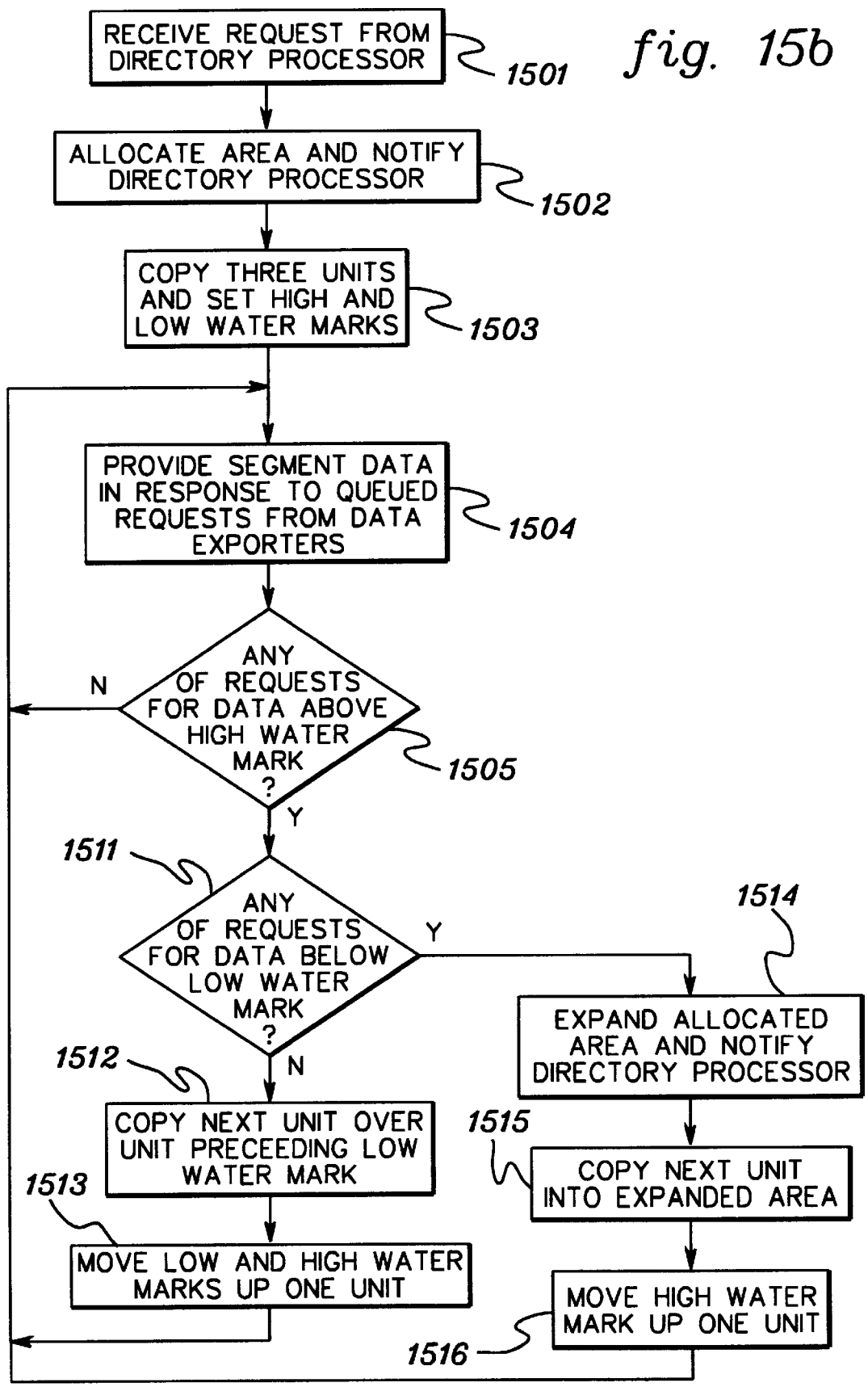
FIG. 15b provides an example of process flow in a cache processor of a preferred embodiment of the invention for managing the amount of memory allocated to a presentation.
Figure 15C:
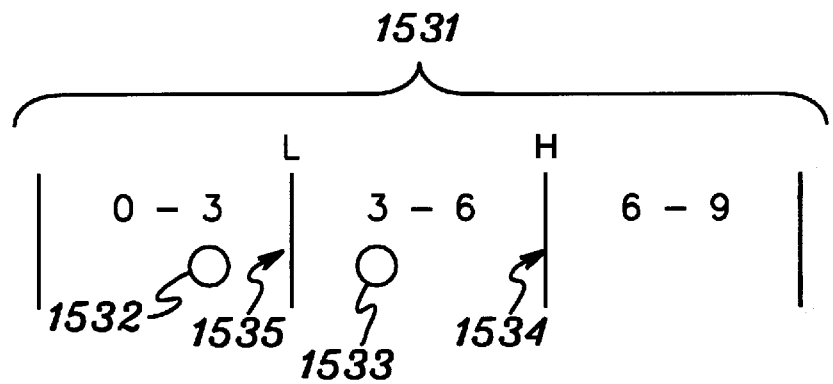
FIGS. 15c–15i illustrate memory allocation and units of video presentation data stored in a cache processor memory area in accordance with the method illustrated in FIG. 15b.

As implied with respect to FIG. 15a, the cache processor will contain a finite number of segments of a presentation. FIG. 15b shows an example of a process in a cache processor for managing the number of segments which are stored in the processor at any one time. In general terms, this process involves implementing a "round robin" memory scheme for storing only as much segment data as is necessary to satisfy existing receiving groups, and for expanding the round robin when such will succeed in satisfying the requests of new groups.

Referring specifically to FIG. 15b, when the cache processor receives 1501 a request from the directory processor to store a presentation, the cache processor will allocate 1502 an area in its memory for storage of the presentation and notify the directory processor of the area name and size. Subsequently the cache processor will copy 1503 three units of the presentation, set a "low water mark" at the end of the first unit, and set a "high water mark" at the end of the second unit. The purpose of the low and high water marks will become apparent from the discussion which follows. For purposes of facilitating illustration, particularly in accordance with FIGS. 15c–15i, it will be assumed that the "units" of the presentation copied into the cache processor are equal units each having a three minute duration. This teaching will allow those of ordinary skill in the art to implement other similar methods using non-equal units.

Returning to FIG. 15b, once the low and high water marks are set, segment data is provided 1504 in accordance with the method of FIG. 15a. This may include receiving and processing requests of additional data exporters for additional segments of the presentation. After providing all segment data to every requester in the supply queue, the cache processor will determine 1505 whether any of those requests were for segments falling above the high water mark. If none are, then the cache processor again provides 1504 segment data as illustrated in FIG. 15a. Thus one or more data exporters may progress along the round robin of segment data by making successive requests for successive segments during successive request windows. An illustration of such a scenario is provided in FIG. 15c, in which one data exporter 1533 has progressed along the round robin 1531 so as to be receiving data from within the second unit (minutes 3–6 of the presentation), while another later-requesting data exporter 1532 has progressed along the round robin so as to be receiving data from within the first unit (minutes 0–3 of the presentation). It can be inferred from FIG. 15c that the two data exporters shown are approximately two minutes apart along the round robin.

Figure 15D:
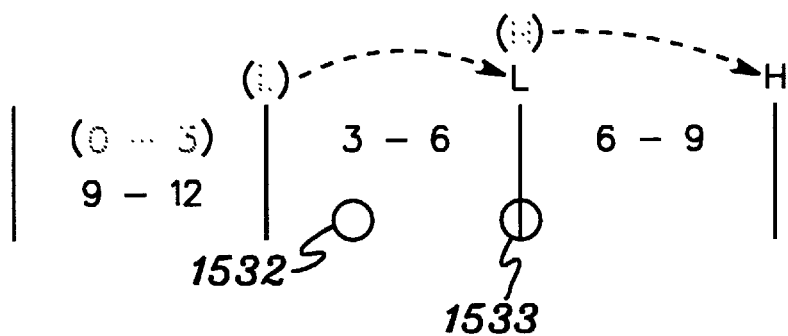
Figure 15E:
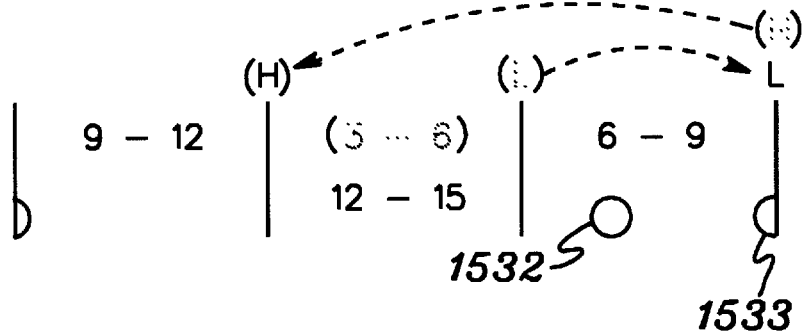

Returning to FIG. 15b, if any data exporter has requested data above the high water mark, the cache processor then determines 1511 whether any of the data exporters has requested data below the low water mark. If no data exporter has requested data below the low water mark, the data in the unit of the ribbon below the low water mark is replaced 1512 with the next unit of the presentation coming after the unit of the robin above the high water mark. The low and high water marks are then moved 1513 forward one unit. These steps are illustrated in FIGS. 15d and 15e. Referring to FIG. 15d, it can be seen that the lead data exporter 1533 has just crossed the high water mark 1534 of FIG. 15c, while the trailing data exporter 1532 is already beyond the low water mark 1535 of FIG. 15c. Consequently the unit of the robin which contained minutes 0–3 of the presentation may be copied over to contain minutes 9–12 of the presentation. The high and low water marks are then advanced one unit. Referring to FIG. 15e, it may be seen that a similar copying and advancement of marks will be repeated after the passage of another unit. The two data exporters will therefore continue to travel around a robin of three units in length which is periodically updated with a new unit of segment data above the high water mark each time the high water mark is advanced.

Figure 15F:
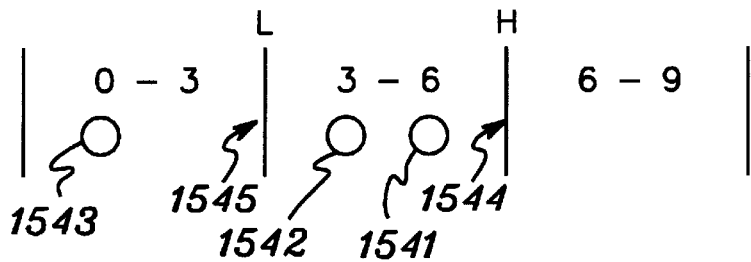
Figure 15G:
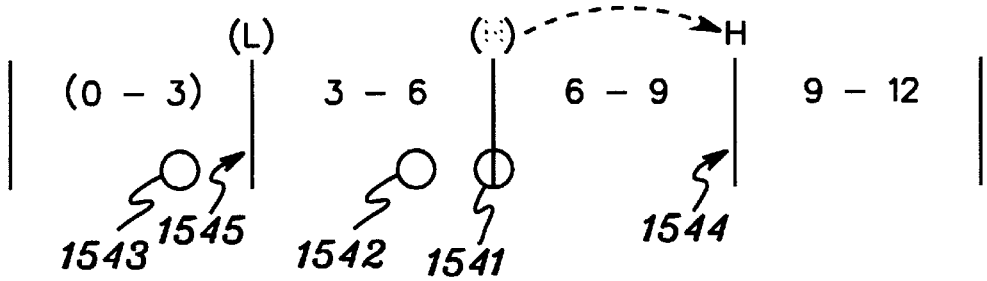
Figure 15H:
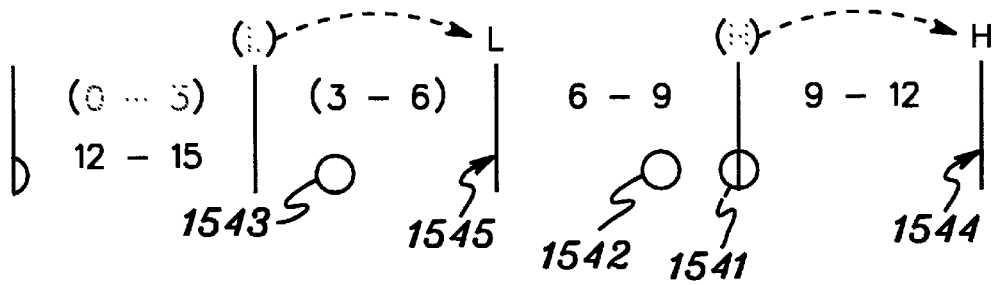

Returning to FIG. 15b, it may alternatively be the case that while one data exporter has passed the high water mark, another has not yet reached the low water mark. Such a case is illustrated in FIGS. 15f–15g. It may be seen in FIG. 15g that the lead data exporter 1541 has reached the high water mark 1544 of FIG. 15f, but that the trailing data exporter 1543 has not yet hit the low water mark 1545 of FIG. 15f. Consequently, as shown in FIG. 15b, the cache processor will expand 1514 the memory area allocated to the round robin, notify the directory processor of the expansion, and copy 1515 the next unit of the presentation into the expanded area. The high water mark is then moved 1516 up one unit, but the low water mark is not moved. Referring to FIG. 15g, it may be seen that when the leading data exporter 1541 has reached the high water mark of FIG. 15f, the robin is expanded to include additional minutes 9–12 of the presentation and the position of the high water mark 1544 is advanced by one unit.

Figure 15I:
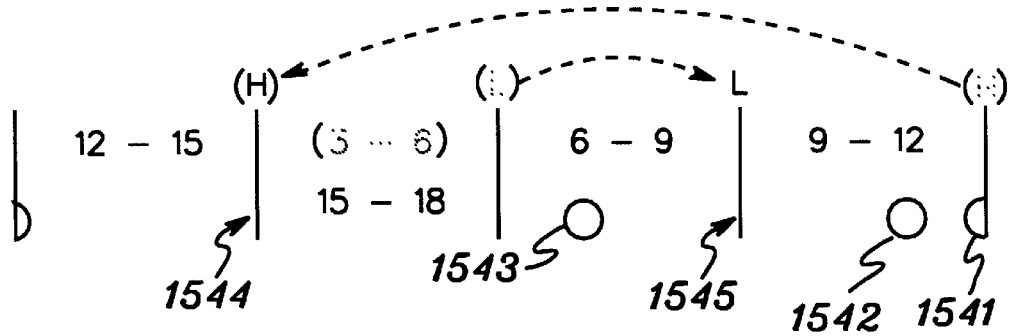

Returning again to FIG. 15b, once the high water mark has been advanced, the cache processor returns to providing 1504 segment data as illustrated in FIG. 15a. Subsequently, as illustrated in FIG. 15b, the cache processor may determine 1505 that the lead data exporter has crossed a new high water mark, and further determine 1511 that the trailing data exporter has already passed the low water mark. Consequently a new unit will be written 1512 over old data on the robin and the low and high water marks will be advanced 1513. The advancement of low and high water marks as a result of such determinations are shown in the changes between FIGS. 15g and 15h. As illustrated in FIG. 15i, these data exporters will thereafter continue to advance around a round robin of four units in length which is periodically updated to include a new unit of segment data above the high water mark 1544. It will be appreciated that under appropriate circumstances the robin may alternatively continue to be expanded until it includes the entire presentation.

D. Operation of the Directory Processor

As noted above, the directory processor is notified of the group membership of receivers by the data exporter when a request for a new presentation, a pause command, a resume command, or a change segment command is processed. The directory processor is also notified by the cache processor of the area names and addresses of each area of memory allocated to presentation data, and of each expansion of such areas. Accordingly, the directory processor contains sufficient data to manage cache processor allocation. An example of process flow in a directory processor for managing cache processor allocation is provided in FIG. 16.

Figure 16:
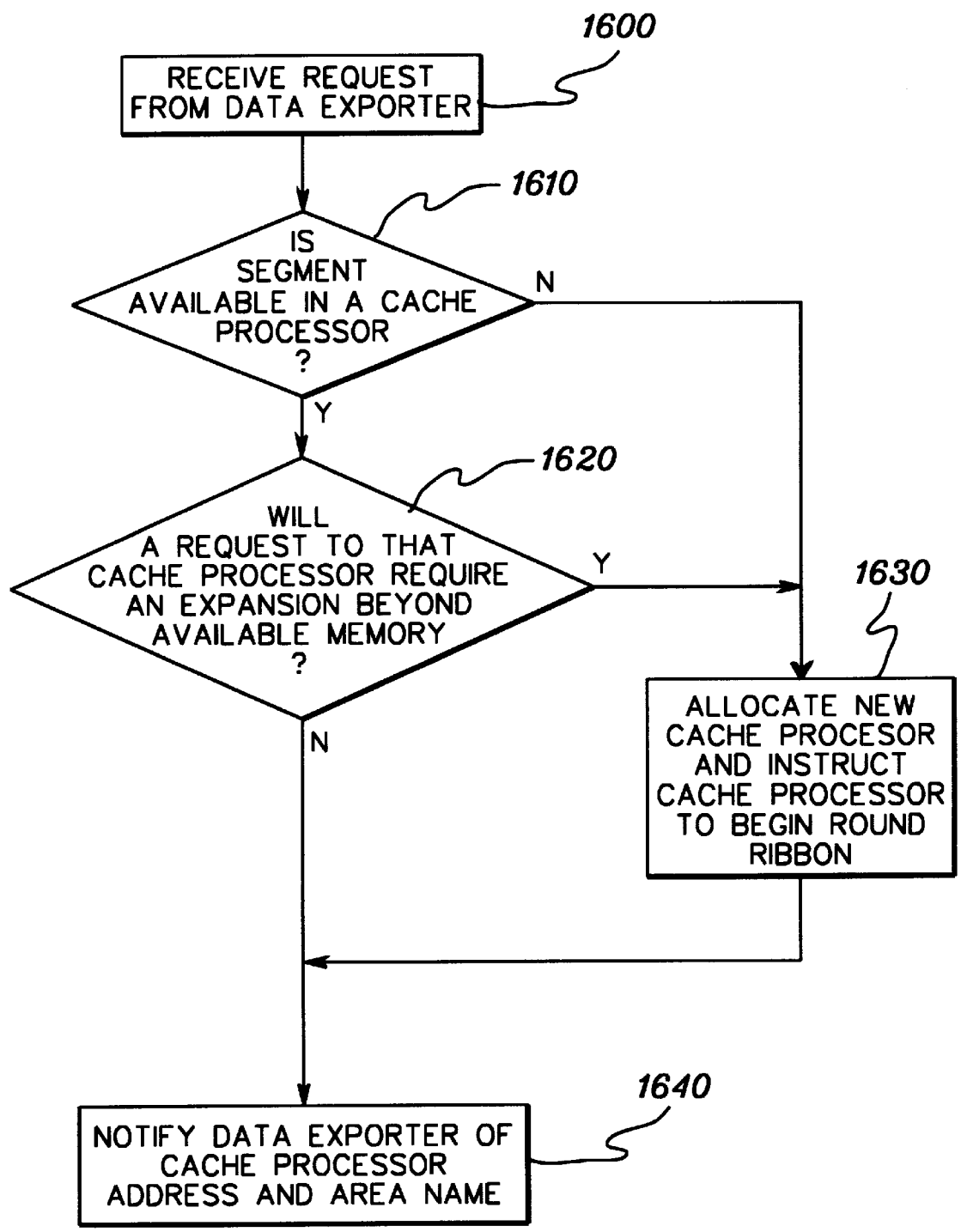
FIG. 16 provides an example of process flow in a directory server of a preferred embodiment of the invention for managing cache processor allocation.

More specifically, as illustrated in FIG. 16, when the directory processor receives 1600 a request from a data exporter for the cache processor address of a segment of a presentation, the directory processor first determines 1610 whether the segment is available in a cache processor. This may be determined by reference to a cache processor allocation table maintained by the directory processor. If it is determined 1610 that the segment is not currently available from a cache processor, or if it is determined 1620 that referring the data exporter to a processor containing the requested segment would result in the cache processor attempting to expand the area for that presentation beyond its memory capacity, then the directory processor allocates 1630 a new cache processor to store the segment and instructs that cache processor to begin the round ribbon process as discussed in regard to FIGS. 15a–15i. Once a cache processor address and area are known to contain the requested segment, the data exporter is notified 1640 of the cache processor address and area name. The data exporter thereafter will interact directly with the cache processor to receive presentation data.

As noted above, the directory processor is also responsible generally for the management of reading and updating of data objects in the system. The management of the reading and updating of data objects in the system is preferably implemented using a novel "share nothing, cache everything" (SNCE) paradigm which is based on the following three principles:

1) an object which is to be available to more than one logical entity of the system may be owned by one and only one logical entity of the system;
2) an owned object may be updated only by the logical entity which owns the object, but the owned object may be read by any logical entity including the owner;
3) the owner of an object has the exclusive right to lock out reads and updates of the owned object.

Figure 17:
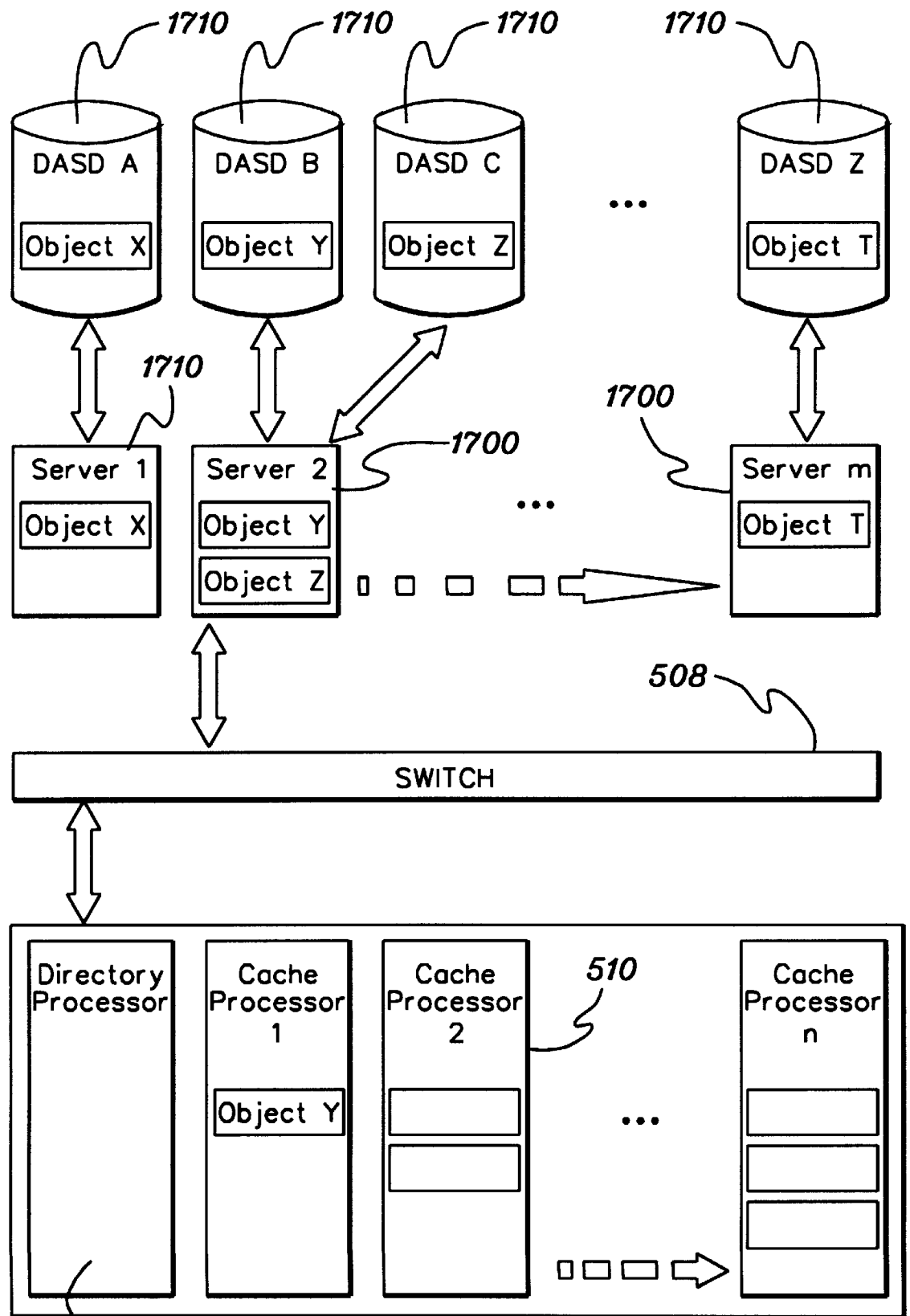
FIG. 17 provides an enhanced diagram of portions of the embodiments of FIGS. 5 and 6 including servers and data objects.

An enhanced illustration of the components of a system of the general type illustrated in FIGS. 5 and 6 is provided in FIG. 17. The system may be seen to include multiple servers 1700 each connected to one or more storage devices 1710. Examples of data objects which may be stored in the various storage devices 1710 and servers 1700 of such a system include the cache allocation table maintained by the directory processor, the supply queue maintained by each cache processor, and the video presentation files stored in storage devices. The SNCE paradigm provides methods for managing the constant reading and updating of these objects which will occur in such a system.

Figure 18:
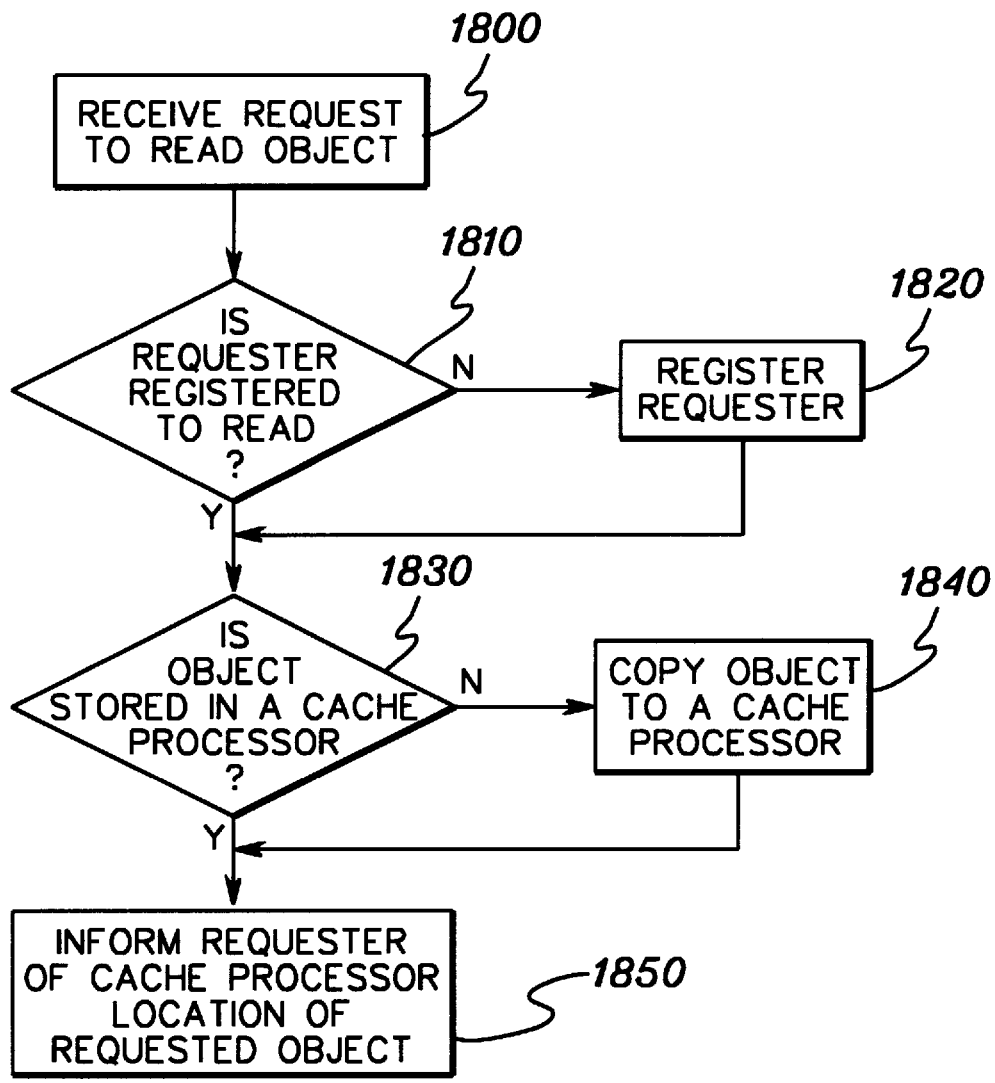
FIG. 18 provides an example of process flow in a logical entity of a preferred embodiment of the invention for reading an object owned by a server.

An example of a process for processing a read object request in accordance with the SNCE paradigm is illustrated in FIG. 18. The process may be illustrated by considering the example of a data exporter which has requested a presentation. In accordance with SNCE, the data exporter must request the reading of the object (the presentation) from its owner, which in this case is the logical entity comprising the directory server and the video repository server coupled to the storage device on which the presentation is stored. Upon receiving the request, the owner will allow the requester to read the requested object from a cache processor containing the object, in this case, the presentation. This may require the owner to prime the presentation and then copy it to a cache processor.

Accordingly, as illustrated in FIG. 18, a logical entity will receive 1800 a request to read an object which it owns. The requester, for example a data exporter, will be aware of the ownership of the object through reference to an object ownership table maintained and distributed by the directory processor. The object owner will determine 1810 whether the requesting data exporter is registered to read the object. If it is not, the data exporter will be added 1820 to an "interested member" table which is maintained by the owner and also cached in the owners associated cache processor. Thereafter the owner will determine 1830 whether the requested object is stored in a cache processor. If it is not, the owner will prime the object into its local memory and then copy 1840 the object to a cache processor allocated by the directory server. Once the location of the object in a cache processor is determined, the owner will inform 1850 the requester of the location of the object in cache memory. The requester is thereafter free to request reads directly from the cache processor. It will be recognized that this description accords with the process for cache processor allocation described with regard to FIG. 16.

In short, the SNCE paradigm dictates that an object owner receiving a request to read an object may not provide the object directly to the requester, but rather directs the requester to an associated cache processor containing the object. Thus, referring back to FIG. 17, if Server 2 in association with the directory processor is the owner of a presentation labeled as Object Y, and Server M, a data exporter, sends a request to Server 2 to read Object Y, Server 2 will initiate the copying of Object Y from cache processor 1.

Figure 19:
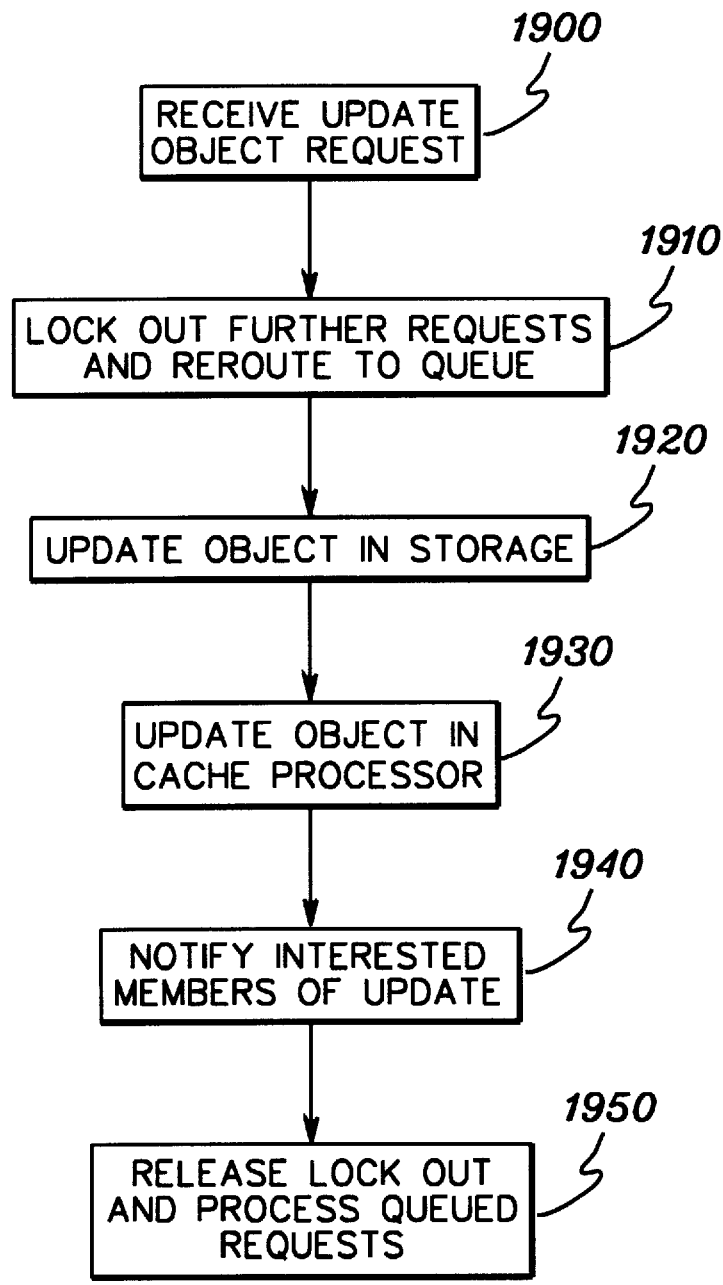
FIG. 19 provides an example of process flow in a preferred embodiment of the invention for updating an object owned by a server.

As noted above, the owner of an object further has the exclusive right to update objects which it owns. FIG. 19 illustrates an example of a process for updating an object in accordance with SNCE. The process may be illustrated by considering the round ribbon method implemented in a cache processor to dynamically manage its internal memory allocation. In the process of expanding its memory allocation for a given presentation, the cache processor must inform the directory processor of the new address of the memory area. In other words, the cache processor must request an update of the cache allocation table maintained and owned by the directory processor.

Accordingly, as illustrated in FIG. 19, the directory processor will receive 1900 an update object request from the cache processor to update its cache allocation table. The directory processor will lock out 1910 further requests to read or update the cache allocation table and will reroute these requests to a local queue. The directory processor will then update 1920 the cache allocation table in its local storage. The directory processor will further update 1930 the cache allocation table in its associated cache processor, which in the case of the directory processor will be the directory processor itself. Interested members are then notified 1940 of the update to the cache allocation table. The interested members will be those system entities which have previously read the cache allocation table. After notifying interested members, the lock out is released 1950 and queued requests are processed.

As noted above, two types of lock out may be employed. In a first type, called an "exclusive lock", the lock prevents both updating and reading of the object during the updating process. In contrast, a second type of lock called a "write lock" prevents updating during the update process but allows reading of the object during the update process. This type of read is termed a "dirty read". The choice between the use of an exclusive lock and a write lock will depend on the necessity of providing data which accurately reflects all information which is the subject of the object.

To illustrate the difference between the two types of locks, consider the following two cases. The first case concerns a data object which is stored in a cache processor and which represents a part of a presentation. At times this object may be updated to extend the length of the part stored in the cache processor; however, for purposes of providing a single segment to a data exporter in response to a read request, it may not matter whether that segment is provided to the data exporter before or after the object is updated. Consequently, it may be desirable to employ a write lock in conjunction with such objects. In contrast, the second case concerns a cache allocation table stored in the directory processor. A data exporter requiring information as to the location of presentation data must be provided with accurate data or else it will erroneously request the presentation from the wrong cache processor and will delay delivery of the presentation to receivers. Accordingly, an exclusive lock should be used in regard to the cache allocation table.

E. Specifications for an Exemplary Video on Demand System

As discussed above, a video on demand embodiment of the invention will optimally be capable of multicasting all segments of a presentation within a period L which equals the predefined request window and the predefined segment length associated with the presentation. The specific system components chosen to implement the invention will be dictated by factors such as the type of presentations presented, the number of presentations to be provided, and the number of receivers to be served. To provide an example of how these determinations may be made, consider a system which is designed to meet the following criteria:

1) the system must be capable of providing simultaneous service to all of 30,000 users;
2) the system must make available to all viewers at all time 10 movies, with each movie having a duration of 2 hours;
3) each movie is encoded in MPEG2, and comprises approximately 4 Gbytes of data or approximately 4.5 Mbits of data per second;
4) each movie will be provided in predefined 30 second segments; and
5) the system will utilize a 30 second request window for all 2400 segments of all 10 movies.

Reference is again made to the system illustrated in FIG. 2. It may be assumed that each of the processing nodes shown in the system comprises an RS/6000 and that each of the switches provides a connectionless environment with multicasting capabilities. Such switches may comprise an ATM network switch. It may further be assumed that each receiver associated with the system has sufficient memory to hold three seconds of MPEG2 data, or approximately 1.7 Mbytes of memory. Consequently the portion size (the size of portions provided by the data exporters to receivers) may be chosen to be three seconds. The receivers may further be assumed to comprise a processor. Thus a receiver may be, for example, a personal computer, or a dedicated video decoder terminal (sometimes referred to as a "set top box").

Working backward from the receiver end of the system, in order to supply 30,000 viewers each with 4.5 Mbits of data per second, the front end connectionless environment for providing signals to all receivers must be capable of supplying as much as 135 Gbits/s. It is further assumed that each data exporter will be capable of exporting data equal to 20% of the entire segment data portion load for one movie, or approximately 80 Mbytes, within a period equal to the portion length of three seconds. The data exporter must therefore be capable of both input and output at a rate greater than 213 Mbits/s. Since ATM adapter cards have a throughput rate of 155 Mbits/s, the data exporter may therefore be provided with three ATM cards for input and three ATM cards for output, providing 455 Mbits/s of input and output for each exporter which well exceeds expected input and output requirements.

It is further assumed that each cache processor will be provided with 2 Gbytes of memory. Accordingly, two cache processors will be capable of storing an entire movie. As related above, it is desirable for each cache processor to be capable of delivering all of the segments which it contains within a period equalling the segment length and request window L. Since a cache processor may contain as many as half of the segments of a two hour movie, or approximately 2.0 Gbytes, the cache processor must be capable of providing segments to the data exporter at a rate of 2 Gbytes every 30 seconds, or 533 Mbits/second. The cache processor may therefore be provided with five ATM cards, thus allowing a maximum output rate of 775 Mbits/s which well exceeds expected output requirements. For a system which is required to supply 10 movies, the back end connectionless environment must be capable of transmitting 40 Gbytes of data every 30 seconds, thus requiring a bandwidth of 10 Gbits/s. This bandwidth may be achieved through the use of several IBM 8220 ATM switches.

Thus a system configured in accordance with FIG. 2 and using components as described heretofore will be capable of providing digitally encoded presentations on demand at all times within the specified parameters. It will be appreciated by those of ordinary skill in the art that the system architecture described herein is highly scalable and may be adapted to support any number of presentations and receivers.

Accordingly, the invention may be embodied in a system for distributing digitally encoded presentations as described above. By caching presentations which have been requested, and by grouping receivers into receiving groups for receiving multicasts of segments of the presentation, the system can provide presentations to any number of receivers at the request of the receivers, irrespective of whether the presentation is then being viewed by other receivers. Where time coded presentations are provided, the system will optimally be capable of multicasting all segments of a time coded presentation within a period equalling both the request window and single segment length L, thus essentially making the presentation available for receipt every L seconds.

While the specific embodiments described above provide structures and methods which are best modes presently known to the inventors for carrying out the invention, the invention is capable of a variety of alternative embodiments. The flow diagrams, hardware configurations and processes depicted herein are exemplary. Those of ordinary skill in the art will be aware of other modifications involving equivalent components, methods of operation and methods of use which may be made to the embodiments described herein without departing from the scope of the invention as defined in the following claims.

What is claimed is:

1. A system for distributing through a connectionless environment data representing a digitally encoded presentation, comprising:

means for receiving a request, issued by a receiver, for one segment of a plurality of predefined segments of said digitally encoded presentation;

means for creating a receiving group, said receiving group being designated to receive said one segment;

means for assigning said receiver to said receiving group;

means for multicasting said one segment to said receiving group subsequent to the passage of a predefined amount of time since the creation of said receiving group.

2. The system of claim 1, further comprising:

means for receiving additional requests, issued by additional receivers, for said one segment; and means for assigning said additional receivers to said receiving group.

3. The system of claim 2, wherein said means for multicasting said one segment to said receiving group comprises means for simultaneously providing said one segment to said receiver and said additional receivers.

4. The system of claim 1, further comprising means for deleting said receiving group subsequent to said providing of said one segment to said receiving group.

5. The system of claim 1, wherein said plurality of predefined segments of said digitally encoded presentation are to be provided in a predetermined order, and said system further comprises means for designating said receiving group to receive a segment of said plurality of predefined segments which is immediately successive in said predetermined order to said one segment of said digitally encoded presentation after said one segment has been provided to said receiving group.

6. A system for distributing data representing a digitally encoded linear presentation, comprising:

one or more receiving groups, each of said one or more receiving groups having a designation of one of a plurality of sequential segments of predefined duration of said digitally encoded linear presentation designated to be received thereby;

means for periodically providing to each of said one or more receiving groups its designated segment at intervals equal to said predefined duration of said segments; and means for incrementing said designation of each of said one or more receiving groups subsequent to said providing to each of said one or more receiving groups its designated segment.

7. The system of claim 6, further comprising:

means for receiving a request, issued by a receiver, for a requested segment of said plurality of sequential segments; and means for assigning said receiver to a receiving group of said one or more receiving groups which is designated to receive said requested segment.

8. The system of claim 7, further comprising:

means for determining upon said receiving a request whether any of said one or more receiving groups is designated to receive said requested segment; and means for creating a receiving group designated to receive said requested segment if none of said one or more receiving groups is designated to receive said requested segment.

9. A method for distributing data representing a digitally encoded linear presentation, comprising:

periodically providing to each of one or more receiving groups a segment designated to be received by said receiving group, each of said one or more receiving group having a designation of one of a plurality of sequential segments of predefined duration of said digitally encoded linear presentation to be received thereby; and incrementing said designation of each of said one or more receiving groups subsequent to said providing to each of said one or more receiving groups its designated segment.

10. The method of claim 9, further comprising:

receiving a request, issued by a receiver, for a requested segment of said plurality of sequential segments; and assigning said receiver to a receiving group of said one or more receiving groups which is designated to receive said requested segment.

11. The method of claim 10, further comprising:

determining upon said receiving a request whether any of said one or more receiving groups is designated to receive said requested segment; and creating a receiving group designated to receive said requested segment if none of said one or more receiving groups is designated to receive said requested segment.

12. A computer program product comprising a computer useable medium having computer readable program code means therein for distributing data representing a digitally encoded presentation, the computer readable program code means in the computer program product comprising:

computer readable program code means for periodically providing to each of one or more receiving groups a designated segment, each of said one or more receiving groups having a designation of one of a plurality of sequential segments of predefined duration of said digitally encoded linear presentation to be received thereby; and computer readable program code means for incrementing said designation of each of said one or more receiving groups subsequent to said providing to each of said one or more receiving groups its designated segment.

13. The computer program product of claim 12, further comprising:

computer readable program code means for receiving a request, issued by a receiver, for a requested segment of said plurality of sequential segments; and computer readable program code means for assigning said receiver to a receiving group of said one or more receiving groups which is designated to receive said requested segment.

14. The computer program product of claim 13, further comprising:

computer readable program code means for determining upon said receiving a request whether any of said one or more receiving groups is designated to receive said requested segment; and computer readable program code means for creating a receiving group designated to receive said requested segment if none of said one or more receiving groups is designated to receive said requested segment.

15. A system for distributing data representing a digitally encoded linear presentation, comprising:

one or more receiving groups, each of said one or more receiving groups having a designation of one of a plurality of predefined segments of said digitally encoded linear presentation designated to be received thereby;

means for receiving a request, issued by a receiver, for transmission of said digitally encoded linear presentation beginning with the entirety of a requested segment of said plurality of predefined segments;

means for determining a receiving group of said one or more receiving groups which will next receive the entirety of said requested segment; and means for assigning said receiver to said receiving group which will next receive the entirety of said requested segment.

16. The system of claim 15, wherein said means for assigning said receiver to said receiving group of said one or more receiving groups which will next receive the entirety of said requested segment comprises:

means for assigning said receiver to said receiving group designated to receive said requested segment if a receiving group designated to receive said requested segment is not currently receiving said requested segment; and means for assigning said receiver to a receiving group designated to receive a segment immediately preceding said requested segment if a receiving group designated to receive said requested segment is currently receiving said requested segment.

17. The system of claim 15, wherein each of said plurality of predefined segments has a uniform predefined duration, and said system further comprises:

means for providing each of said one or more receiving groups with its designated segment within a period of time less than said uniform predefined duration; and means for incrementing said segment designation of each of said one or more receiving groups after all of said one or more receiving groups have received their designated segments.

18. The system of claim 15, further comprising:

means for determining, upon receiving a request, whether any of said one or more receiving groups is designated to receive said requested segment; and means for creating a receiving group designated to receive said requested segment if none of said one or more receiving groups is designated to receive said requested segment.

19. A method for distributing data representing a digitally encoded linear presentation, comprising:

receiving a request, issued by a receiver, for transmission of said digitally encoded linear presentation beginning with the entirety of a requested segment of a plurality of predefined segments of said digitally encoded linear presentation;

determining from among one or more receiving groups a receiving group which will next receive the entirety of said requested segment, each of said one or more receiving groups having a designation of one of a plurality of predefined segments to be received thereby; and assigning said receiver to said receiving group which will next receive the entirety of said requested segment.

20. The method of claim 19 wherein said assigning said receiver to said receiving group of said one or more receiving groups which will next receive the entirety of said requested segment comprises:

assigning said receiver to said receiving group designated to receive said requested segment if a receiving group designated to receive said requested segment is not currently receiving said requested segment; and assigning said receiver to a receiving group designated to receive a segment immediately preceding said requested segment if a receiving group designated to receive said requested segment is currently receiving said requested segment.

21. The method of claim 19, wherein each of said plurality of predefined segments has a uniform predefined duration, and said method further comprises:

providing each of said one or more receiving groups with its designated segment within a period of time less than said uniform predefined duration; and incrementing said segment designation of each of said one or more receiving groups after all of said one or more receiving groups have received their designated segments.

22. The method of claim 19, further comprising:

determining, upon receiving a request, whether any of said one or more receiving groups is designated to receive said requested segment; and creating a receiving group designated to receive said requested segment if none of said one or more receiving groups is designated to receive said requested segment.

23. A computer program product comprising a computer useable medium having computer readable program code means therein for distributing data representing a digitally encoded presentation, the computer readable program code means in the computer program product comprising:

computer readable program code means for receiving a request, issued by a receiver, for transmission of said digitally encoded linear presentation beginning with the entirety of a requested segment of a plurality of predefined segments of said digitally encoded linear presentation;

computer readable program code means for determining from among one or more receiving groups a receiving group which will next receive the entirety of said requested segment, each of said one or more receiving groups having a designation of one of a plurality of predefined segments of said digitally encoded linear presentation to be received thereby; and computer readable program code means for assigning said receiver to said receiving group which will next receive the entirety of said requested segment.

24. The computer program product of claim 23, wherein said computer readable program code means for determining assigning said receiver to said receiving group of said one or more receiving groups which will next receive the entirety of said requested segment comprises:

computer readable program code means for assigning said receiver to said receiving group designated to receive said requested segment if a receiving group designated to receive said requested segment is not currently receiving said requested segment; and computer readable program code means for assigning said receiver to a receiving group designated to receive a segment immediately preceding said requested segment if a receiving group designated to receive said requested segment is currently receiving said requested segment.

25. The computer program product of claim 23, wherein each of said plurality of predefined segments has a uniform predefined duration, and said method further comprises:

computer readable program code means for providing each of said one or more receiving groups with its designated segment within a period of time less than said uniform predefined duration; and computer readable program code means for incrementing said segment designation of each of said one or more receiving groups after all of said one or more receiving groups have received their designated segments.

26. The computer program product of claim 23, further comprising:

computer readable program code means for determining, upon receiving a request, whether any of said one or more receiving groups is designated to receive said requested segment; and computer readable program code means for creating a receiving group designated to receive said requested segment if none of said one or more receiving groups is designated to receive said requested segment.

27. A method for pausing the transmission of a digitally encoded linear presentation, comprising:

receiving a pause command issued by a receiver, said receiver being a member of a receiving group designated to receive one of a plurality of predefined segments of said digitally encoded linear presentation; and removing said receiver from said receiving group.

28. The method of claim 27, further comprising:

receiving a resume command issued by said receiver;

determining from one or more receiving groups an appropriate receiving group for receiving said one segment; and assigning said receiver to said appropriate receiving group.

29. The method of claim 28, wherein determining said appropriate receiving group comprises determining whether a receiving group designated to receive said requested segment is currently receiving said requested segment; and and wherein assigning said receiver comprises:

assigning said receiver to said receiving group designated to receive said requested segment if said receiving group designated to receive said requested segment is not currently receiving said requested segment; and assigning said receiver to a receiving group designated to receive a segment immediately preceding said requested segment if said receiving group designated to receive said requested segment is currently receiving said requested segment.

30. The method of claim 29, further comprising:

creating a receiving group designated to receive said requested segment if none of said one or more receiving groups is designated to receive said requested segment.

31. A system for pausing the transmission of a digitally encoded linear presentation, comprising:

means for receiving a pause command issued by a receiver, said receiver being a member of a receiving group designated to receive one of a plurality of predefined segments of said digitally encoded linear presentation; and means for removing said receiver from said receiving group.

32. The system of claim 31, further comprising:

means for receiving a resume command issued by said receiver;

means for determining an appropriate receiving group from among one or more receiving groups for receiving said one segment; and means for assigning said receiver to said appropriate receiving group.

33. The system of claim 32, wherein said means for determining said appropriate receiving group comprises means for determining whether a receiving group designated to receive said requested segment is currently receiving said requested segment; and wherein said means for assigning said receiver comprises:

means for assigning said receiver to said receiving group designated to receive said requested segment if said receiving group designated to receive said requested segment is not currently receiving said requested segment; and means for assigning said receiver to a receiving group designated to receive a segment immediately preceding said requested segment if said receiving group designated to receive said requested segment is currently receiving said requested segment.

34. The system of claim 33, further comprising:

means for creating a receiving group designated to receive said requested segment if none of said one or more receiving groups is designated to receive said requested segment.

35. A method for changing the receiving group membership of a receiver in a system for distributing data representing a digitally encoded linear presentation, comprising:

receiving a change segment command issued by a receiver, said receiver being a member of a receiving group designated to receive one of a plurality of predefined segments of said digitally encoded linear presentation;

receiving a designation of a requested segment of said digitally encoded linear presentation from said receiver;

removing said receiver from said receiving group;

determining an appropriate receiving group from among one or more receiving groups for receiving said requested segment; and assigning said receiver to said appropriate receiving group.

36. The method of claim 35, wherein determining said appropriate receiving group comprises determining whether a receiving group designated to receive said requested segment is currently receiving said requested segment; and wherein assigning said receiver comprises:

assigning said receiver to said receiving group designated to receive said requested segment if said receiving group designated to receive said requested segment is not currently receiving said requested segment; and assigning said receiver to a receiving group designated to receive a segment immediately preceding said requested segment if said receiving group designated to receive said requested segment is currently receiving said requested segment.

37. The method of claim 36, further comprising:

creating a receiving group designated to receive said requested segment if none of said one or more receiving groups is designated to receive said requested segment.

38. A system for changing the receiving group membership of a receiver in a system for distributing data representing a digitally encoded linear presentation, comprising:

means for receiving a change segment command issued by a receiver, said receiver being a member of a receiving group designated to receive one of a plurality of predefined segments of said digitally encoded linear presentation;

means for receiving a designation of a requested segment of said digitally encoded linear presentation from said receiver;

means for removing said receiver from said receiving group;

means for determining from among one or more receiving groups an appropriate receiving group for receiving said requested segment; and means for assigning said receiver to said appropriate receiving group.

39. The system of claim 38, wherein said means for determining said appropriate receiving group comprises means for determining whether a receiving group designated to receive said requested segment is currently receiving said requested segment; and wherein said means for assigning said receiver comprises:

means for assigning said receiver to said receiving group designated to receive said requested segment if said receiving group designated to receive said requested segment is not currently receiving said requested segment; and means for assigning said receiver to a receiving group designated to receive a segment immediately preceding said requested segment if said receiving group designated to receive said requested segment is currently receiving said requested segment.

40. The system of claim 39, further comprising:

means for creating a receiving group designated to receive said requested segment if none of said one or more receiving groups is designated to receive said requested segment.

41. A method for managing allocation of memory in a round ribbon data serving apparatus comprising:

defining an area of memory as a round ribbon area;

copying a first predefined number of data units into said round ribbon area;

setting a low water mark at a point of the round ribbon area a predefined number of data units from the beginning of said round ribbon area;

setting a high water mark at a point of the round ribbon area a predefined number of data units from the end of said round ribbon area;

providing sequential portions of data from said round ribbon area to one or more receivers;

determining whether any of said one or more receivers has reached said high water mark;

if any of said one or more receivers has reached said high water mark, determining whether any of said one or more receivers is below said low water mark; and if any of said one or more receivers has reached said high water mark and any of said one or more receivers is below said low water mark, expanding said round ribbon area by a second predefined number of data units, copying an additional second predefined number of data units into said expanded part of said round ribbon area, and advancing said high water mark by said second predefined number of data units.

42. A system for managing allocation of memory in a round ribbon data serving apparatus comprising:

means for defining an area of memory as a round ribbon area;

means for copying a first predefined number of data units into said round ribbon area;

means for setting a low water mark at a point of the round ribbon area a predefined number of data units from the beginning of said round ribbon area;

means for setting a high water mark at a point of the round ribbon area a predefined number of data units from the end of said round ribbon area;

means for providing sequential portions of data from said round ribbon area to one or more receivers;

means for determining whether any of said one or more receivers has reached said high water mark;

means for determining whether any of said one or more receivers is below said low water mark if any of said one or more receivers has reached said high water mark; and means for expanding said round ribbon area by a second predefined number of data units, copying an additional second predefined number of data units into said expanded part of said round ribbon area, and advancing said high water mark by said second predefined number of data units, if any of said one or more receivers has reached said high water mark and any of said one or more receivers is below said low water mark.

43. A computer program product comprising a computer useable medium having computer readable program code means therein for managing allocation of memory in a round ribbon data serving apparatus, the computer readable program code means in the computer program product comprising:

computer readable program code means for defining an area of memory as a round ribbon area;

computer readable program code means for copying a first predefined number of data units into said round ribbon area;

computer readable program code means for setting a low water mark at a point of the round ribbon area a predefined number of data units from the beginning of said round ribbon area;

computer readable program code means for setting a high water mark at a point of the round ribbon area a predefined number of data units from the end of said round ribbon area;

computer readable program code means for providing sequential portions of data from said round ribbon area to one or more receivers;

computer readable program code means for determining whether any of said one or more receivers has reached said high water mark;

computer readable program code means for determining, if any of said one or more receivers has reached said high water mark, whether any of said one or more receivers is below said low water mark; and computer readable program code means for expanding said round ribbon area by a second predefined number of data units, copying an additional second predefined number of data units into said expanded part of said round ribbon area, and advancing said high water mark by said second predefined number of data units, if any of said one or more receivers has reached said high water mark and any of said one or more receivers is below said low water mark.

44. A method for processing a request to read an object in a data server system comprising:

receiving a request to read an object owned by a logical entity of the data server system; and notifying an issuer of said request of a cache processor of the data server system external to said logical entity from which said issuer may read said object.

45. The method of claim 44, further comprising registering said issuer as an interested member associated with said object.

46. A system for processing a request to read an object in a data server system comprising:

means for receiving a request to read an object owned by a logical entity of the data server system; and means for notifying an issuer of said request of a cache processor of the data server system external to said logical entity from which said issuer may read said object.

47. The system of claim 46, further comprising means for registering said issuer as an interested member associated with said object.

48. A method for processing a request to update an object in a data server system comprising:

receiving a request to update an object owned by a logical entity of the data server system;

locking out further requests to update said object and rerouting such requests to a local queue upon receiving said request to update said object;

updating a copy of said object stored in said logical entity upon said locking out of further requests; and updating said object in a cache processor external to said logical entity from said updated object stored in said logical entity upon said updating of said copy of said object stored in said logical entity.

49. The method of claim 48, further comprising:

notifying interested members associated with said object of said updating of said object.

50. The method of claim 48, further comprising:

processing any locked out update requests upon said updating of said object in said cache processor.

51. The method of claim 48, further comprising:

locking out further requests to read said object and rerouting such requests to a local queue upon receiving said request to update said object.

52. A system for processing a request to update an object in a data server system comprising:

means for receiving a request to update an object owned by a logical entity of the data server system;

means for locking out further requests to update said object and rerouting such requests to a local queue upon receiving a request to update said object;

means for updating a copy of said object stored in said logical entity upon locking out further requests; and means for updating said object in a cache processor external to said logical entity from said updated object stored in said logical entity upon updating said copy of said object stored in said logical entity.

53. The system of claim 52, further comprising:

means for notifying interested members associated with said object of said updating of said object.

54. The system of claim 52, further comprising:

means for processing any locked out update requests subsequent to said updating of said object in said cache processor upon updating said object in said cache processor.

55. The system of claim 52, further comprising:

means for locking out further requests to read said object and rerouting such requests to a local queue upon receiving said request to update said object.

* * * * *